US012034236B2

(12) United States Patent
Chvala

(10) Patent No.: US 12,034,236 B2
(45) Date of Patent: Jul. 9, 2024

(54) ARC RESISTANT POWER TERMINAL

(71) Applicant: Carlisle Interconnect Technologies, Inc., St. Augustine, FL (US)

(72) Inventor: Joseph W. Chvala, St. Augustine, FL (US)

(73) Assignee: Carlisle Interconnect Technologies, Inc., St. Augustine, FL (US)

( * ) Notice: Subject to any disclaimer, the term of this patent is extended or adjusted under 35 U.S.C. 154(b) by 232 days.

(21) Appl. No.: 17/738,611

(22) Filed: May 6, 2022

(65) Prior Publication Data

US 2022/0320764 A1 Oct. 6, 2022

Related U.S. Application Data

(63) Continuation-in-part of application No. PCT/US2020/059433, filed on Nov. 6, 2020.

(Continued)

(51) Int. Cl.
*H01R 11/12* (2006.01)

(52) U.S. Cl.
CPC .................................... *H01R 11/12* (2013.01)

(58) Field of Classification Search
None
See application file for complete search history.

(56) References Cited

U.S. PATENT DOCUMENTS 4,288,504 A * 9/1981 Julian .................. H01R 11/284
439/522

4,483,910 A * 11/1984 Julian ................. H01M 50/503
429/185

(Continued)

FOREIGN PATENT DOCUMENTS

WO 2017070484 A1 4/2017
WO 2018059666 A1 4/2018

OTHER PUBLICATIONS

European Patent Office; Search Report and Written Opinion in related International Patent Application No. PCT/US2020/059433 dated Feb. 9, 2021; 12 pages.

*Primary Examiner* — Ross N Gushi
(74) *Attorney, Agent, or Firm* — Wood Herron & Evans LLP

(57) ABSTRACT

An electrical terminal for coupling to a conductive structure includes a body having a wire receiving portion for receiving a conductor. A cup portion is electrically coupled with the wire receiving portion and a boss portion extends from the cup portion. An overmold structure of insulation material is formed on the cup portion and covers the cup portion sides. An aperture is formed in the body and extends through the cup portion and the boss portion for receiving a post of the conductive structure for securing the terminal to the conductive structure. A fastener is configured for engaging a post and securing the boss portion against the conductive structure. The boss portion is configured to surround the aperture for providing an electrically conductive surface free from insulation material for interfacing with the conductive structure. The fastener and post are contained in the cup portion and an insulative cap is configured for engaging the overmold structure and sealing the cup structure around the fastener and post of a conductive structure.

20 Claims, 28 Drawing Sheets

Related U.S. Application Data

(60) Provisional application No. 62/932,284, filed on Nov. 7, 2019.

(56) References Cited

U.S. PATENT DOCUMENTS

| | | | | |
|---|---|---|---|---|
| 8,894,429 | B2 * | 11/2014 | Jackson | H01R 9/2458 439/212 |
| 9,385,449 | B2 * | 7/2016 | Peters | H01R 4/203 |
| 9,985,362 | B2 * | 5/2018 | Arenburg | H01R 4/30 |
| 10,211,565 | B2 * | 2/2019 | Trimborn | H01R 4/34 |
| 10,381,752 | B2 * | 8/2019 | Kaehny | H01R 4/34 |
| 11,532,910 | B2 * | 12/2022 | Eheim | H01R 4/34 |
| 2023/0327360 | A1 * | 10/2023 | Buchholz | H01R 4/34 |

* cited by examiner

ARC RESISTANT POWER TERMINAL

CROSS-REFERENCE TO RELATED APPLICATIONS

This application is a Continuation-in-Part of International Patent Application No. PCT/US2020/059433 filed Nov. 6, 2020, which claims the benefit of priority to U.S. Provisional Patent Application Ser. No. 62/932,284 filed Nov. 7, 2019, the disclosures of which are incorporated by reference herein.

FIELD OF THE INVENTION

This present invention relates generally to electrical connectors or terminals, and particularly to improving the performance of such terminals in the prevention of electrical arcing and malfunctions.

BACKGROUND OF THE INVENTION

Electrical connectors, or terminals for terminating a power cable connection, are often connected side-by-side to grounding studs, to power strips or on top of each other, such as on a terminal block or on a power strip. They provide power to circuitry and electronics of a system, vehicle, or device, and thus, are often coupled in a tight configuration to address space constraints, such as in an aircraft. The phrases lug, terminal lug, and terminal will be used interchangeably in this application to refer to such terminal connectors.

While wire and cables that are terminated with such terminal are insulated along their length, the terminals themselves are exposed for making electrical contact with other terminals, terminal blocks, or equipment connection points. As a result, arcing can occur between adjacent terminals. Electrocution is also a possibility with such exposure.

The problem with shorting or arcing has become a particular problem within the aerospace industry. Most new airframes are being designed to eliminate hydraulic systems and to replace those systems with electro-mechanical actuators. Also, recent advancements have led to the use of higher electrical voltages and frequencies in an aircraft. Greater us of electrical systems and the respective higher voltages and frequencies directly impact the likelihood of accidental shorting and arc tracking at the terminal connection points. Accidental shorting or arcing between the different voltage phases that are used in such systems can cause damage, and may potentially shut the power down for a system. Furthermore, space constraints exacerbate the issue as the terminals are often positioned close to one another at a terminal block or at equipment connection points. Still further, passenger comfort has led to greater humidity in the environment of the electrical systems.

Contaminants between the terminals may also cause arcing issues. Various dry, liquid, or vapor contaminants have the potential to create an electrical path between terminals under dry, humid, or wet conditions. If the various contaminants can create a low enough current resistance paths between the terminals, then arc tracking may start and progress to the point of significant damage.

There have been various existing methods to try to isolate the terminals in order to prevent arcing. However, such methods often involve mechanical dividers or require increasing separation distances, which may not always be feasible. However, such existing methods have been optimized, and, even with current precautions, the existing elements and methods may still allow the conductive surfaces of the terminal to get close enough to each other to allow arc tracking. The various physical dividers are not sufficient to prevent the arc tracking.

Furthermore, the issue of changing or reconfiguring a connection is often complicated by the insulative or sealing environment. The material, such as molten insulation material, that is applied to the connections and terminals once they are secured is usually of a permanent nature. To disconnect the terminal or to attach additional terminals, the material has to first be removed. Then, once the new connection configuration is complete, the material has to again be applied.

Accordingly, it is an objective of the invention to address arcing concerns between adjacent electrical terminals. It is further the objective to prevent arcing while not compromising the terminal's function. It is a further objective to improve on the configuration and configurability of such terminal connections. The present invention addresses these objectives and various drawbacks in the prior art.

SUMMARY OF THE INVENTION

An electrical terminal for coupling to a conductive structure includes a body having a wire receiving portion for receiving a conductor. A cup portion is electrically coupled with the wire receiving portion and a boss portion extends from the cup portion. The boss portion and includes an exposed planar surface for interfacing with the conductive structure. An overmold structure of insulation material is formed on the cup portion and covers the cup portion sides. An aperture is formed in the body and extends through the cup portion and the boss portion for receiving a post of the conductive structure for securing the terminal to the conductive structure. A fastener is configured for engaging a post and securing the boss portion against the conductive structure. The boss portion is configured to surround the aperture for providing an electrically conductive surface free from insulation material for interfacing with the conductive structure. The fastener and post are contained in the cup portion and an insulative cap is configured for engaging the overmold structure and sealing the cup structure around the fastener and post of a conductive structure.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF EMBODIMENTS OF THE INVENTION

Figure 1:
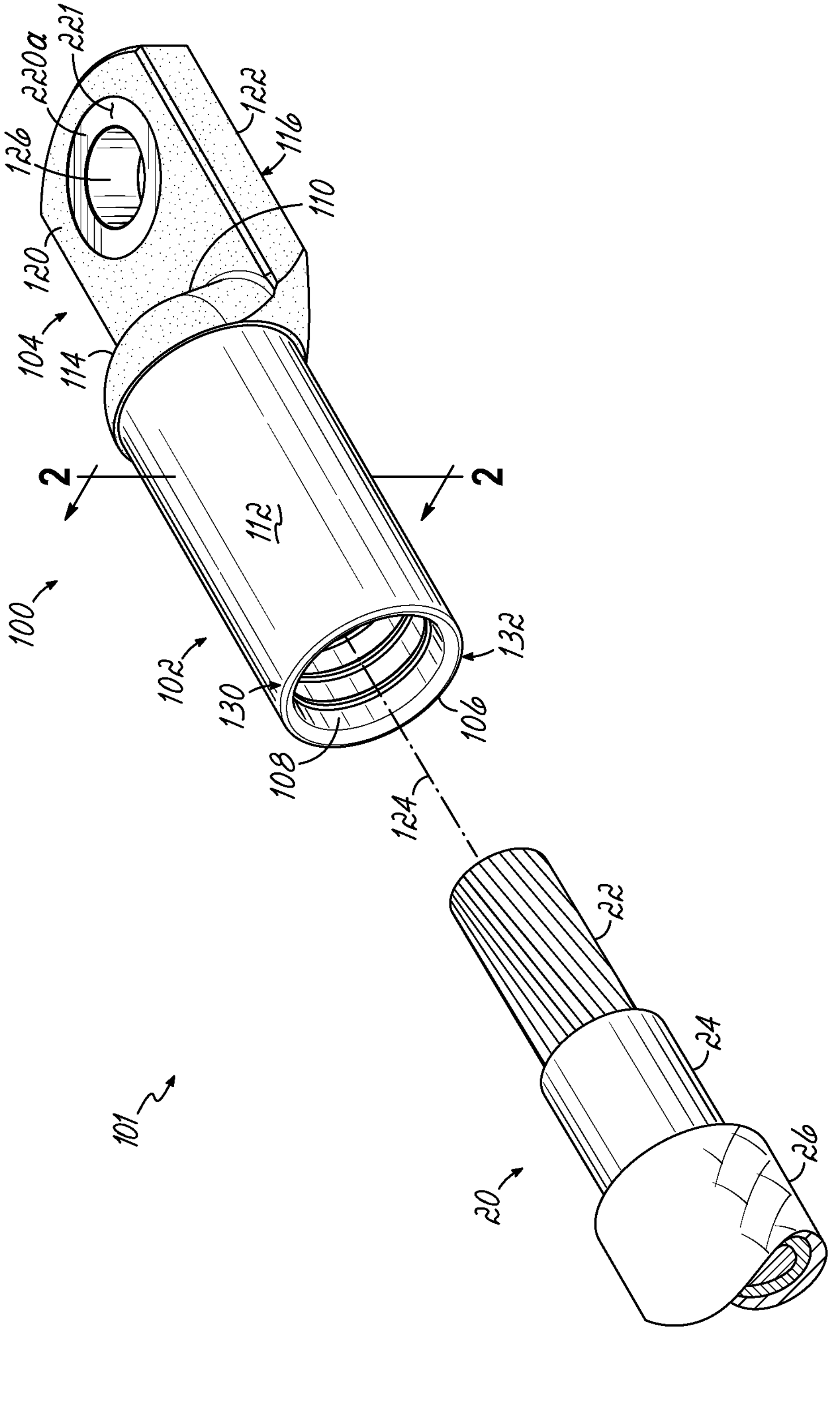
FIG. 1 illustrates one embodiment of the current invention with a terminal incorporated with a conductor.

With reference to FIG. 1, in one embodiment of the invention, an arc resistant electrical terminal 100 in accordance with features of the invention is incorporated into a cable or wire assembly 101. The arc resistant terminal 100 includes a body made from a suitable electrically conductive material, such as a metal such as copper or aluminum. In one embodiment, terminal 100 is a solid piece of 1100 Aluminum per ASTM B221. The terminal has a body with a solid or integral construction and includes a wire receiving portion 102 and an integral mount portion 104. The terminal 100 is incorporated into the cable assembly 101 with a suitable wire or conductor 20, as shown in FIG. 1. Conductor 20, for example, might be a solid or stranded copper or aluminum wire having a center conductor 22 and an insulating sheath 24. In one embodiment, the conductor 20 connected with the terminal may also include an abrasion sheath 26.

Figure 3:
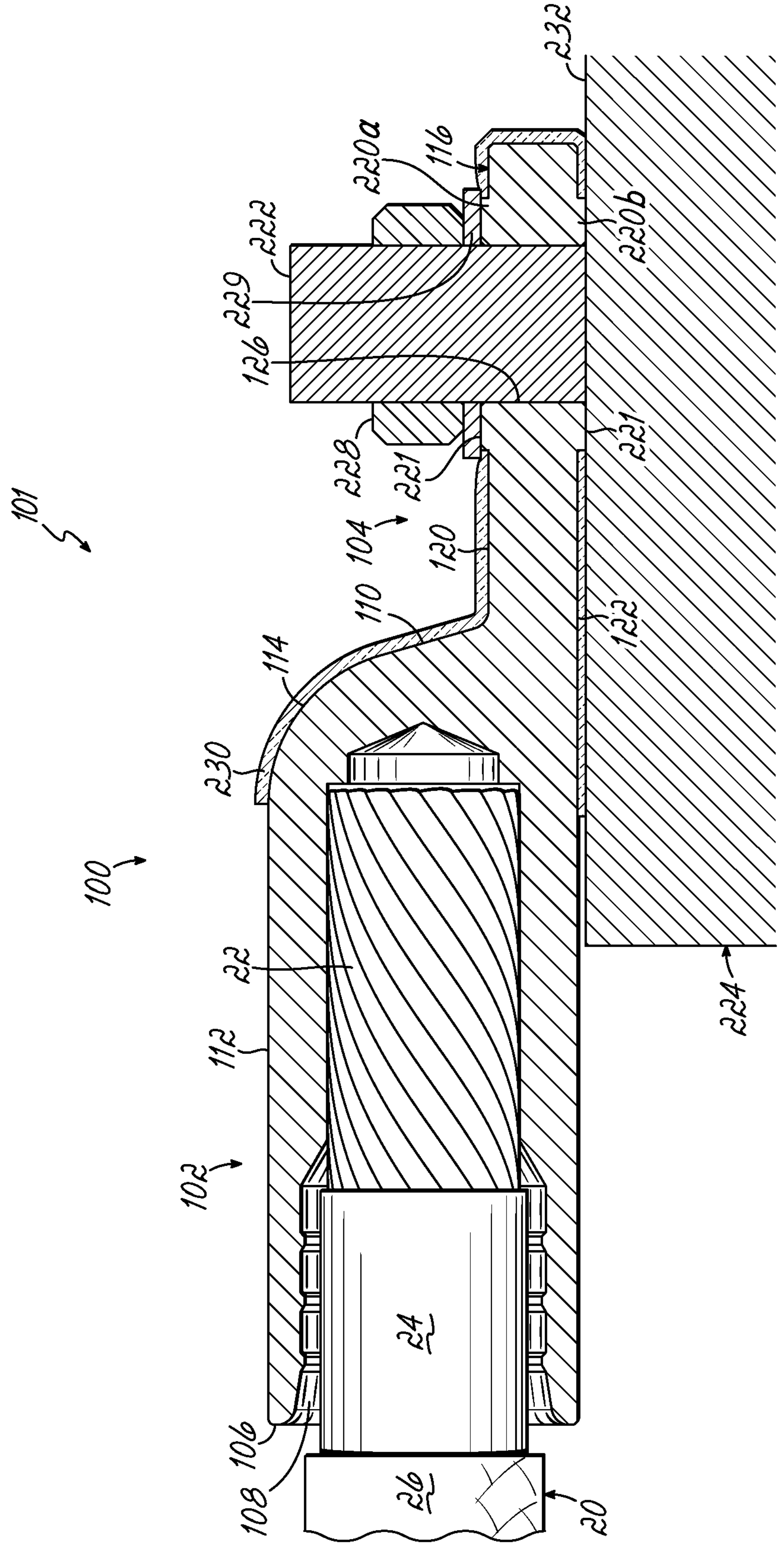
FIG. 3 is a cross-section of an embodiment of a terminal, as illustrated in FIG. 1, and as coupled with a terminal block or another attachment point, such as a motor.

Referring to FIGS. 1 and 3, embodiments of an arc-resistant terminal, in accordance with the invention, are illustrated. Terminal 100 includes a body defining the wire receiving portion 102 that has a front face 106 including an aperture 108, a back face or wall 110, and an outer wall 112 between the front face 106 and the back face 110. The receiving portion 102 thus has an open end and a sealed end and is configured to receive the end of a conductor 20. As illustrated, the receiving portion 102 is show as cylindrical, consistent with the usual cylindrical shape of a wire; however, the receiving portion 102 also may be a variety of other shapes. Between the back face 110 of the receiving portion 102 and the integral mount portion 104 is a transition radius or section 114 that transitions to the mount portion 104.

Figure 8:
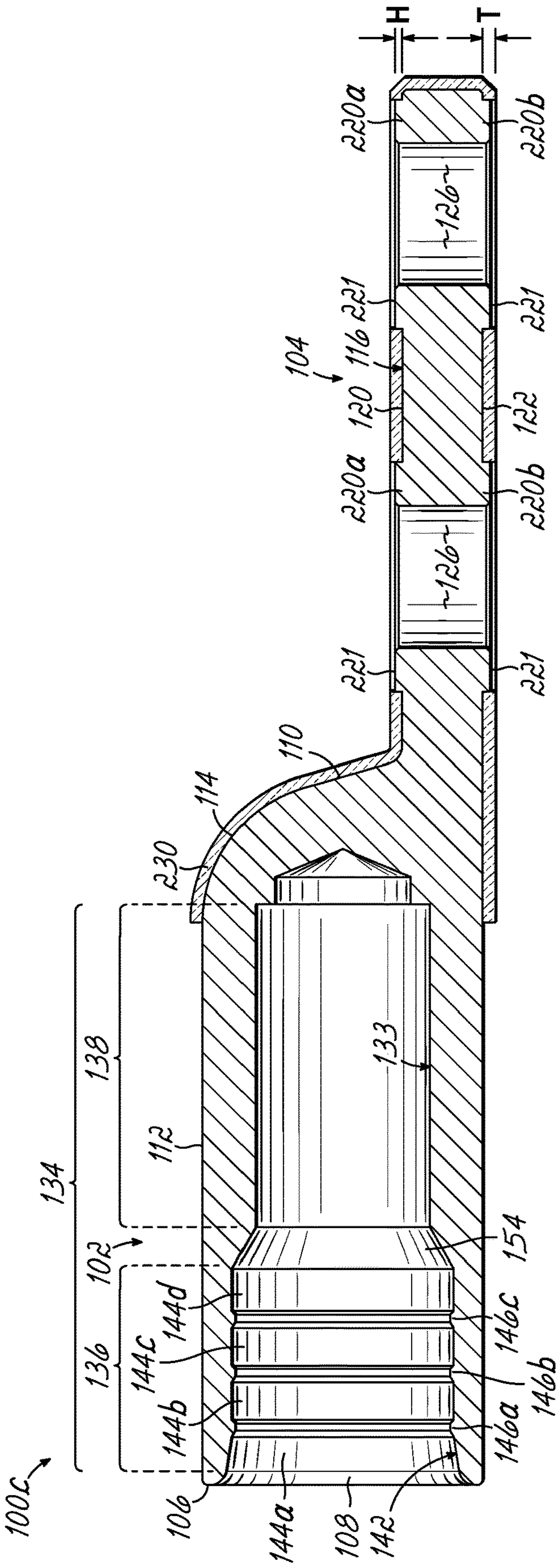
FIG. 8 is a cross-sectional view of the embodiment of FIG. 7.
Figure 8A:
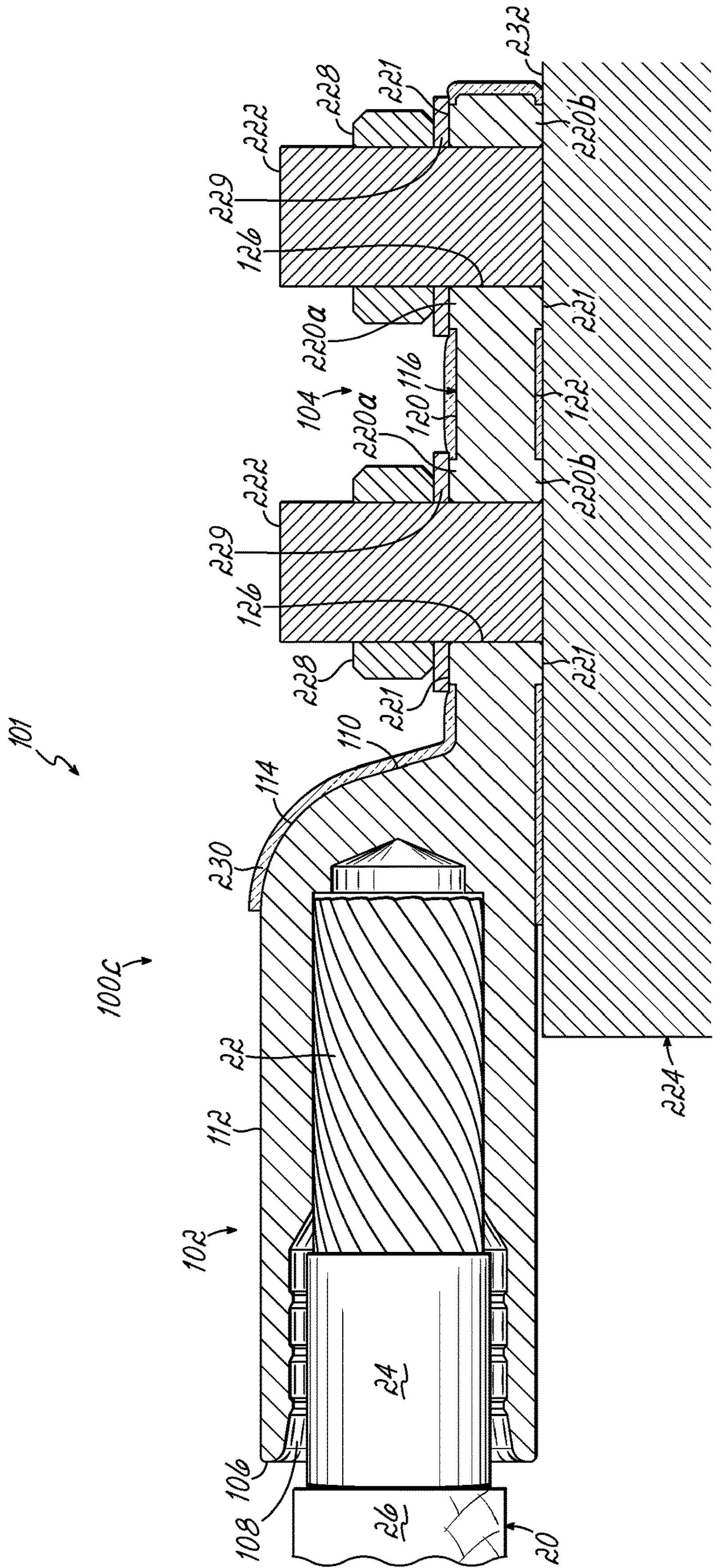
FIG. 8A is a cross-section of an embodiment, as illustrated in FIG. 7, and as coupled with a terminal block.
Figure 8B:
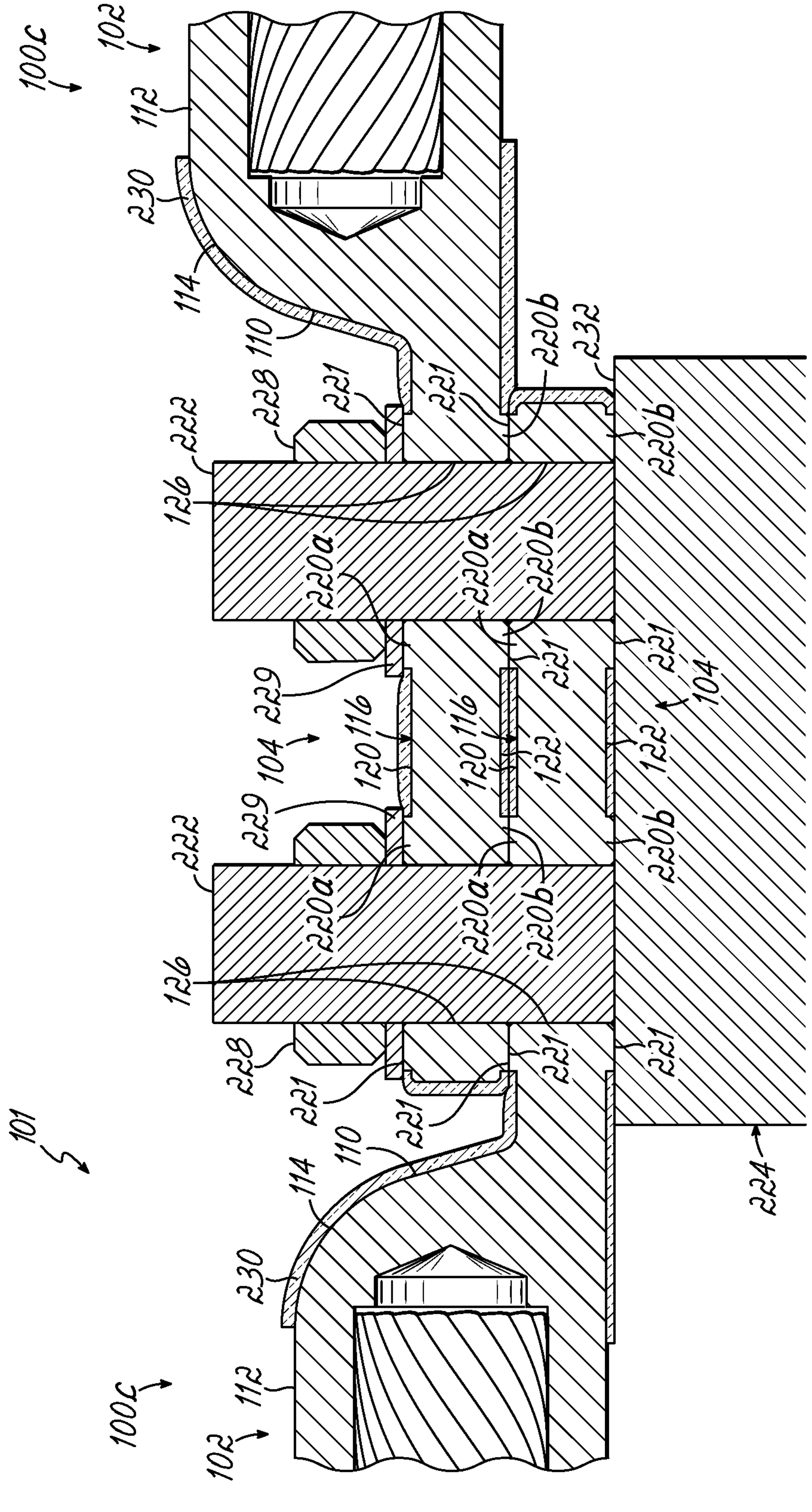
FIG. 8B is a cross-section of an alternative mounting arrangement of multiple terminals as coupled with a terminal block.

For connecting the terminal 100 to a suitable structure at an electrical connection point, such as a terminal block (see FIG. 3), the mount portion has a leg or tongue 116 which may be formed of a solid conductive metal. In the illustrated embodiment, the tongue is referred to as an RT, ring tongue, or sealed tongue configuration. The tongue 116 defines opposing face surfaces, including a top face surface 120 and a bottom face surface 122 that, in one embodiment, are oriented approximately parallel to an axis 124 of the receiving portion 102 of the terminal 100. The tongue 116 in the illustrated embodiment is offset and oriented in a plane below the axis 124. In the embodiment of FIGS. 1-3, 5, an aperture or hole 126 is formed between the face surfaces 120, 122 for connecting the terminal to a connector port either individually or with another terminal overlaid with it as illustrated in FIG. 8B. The aperture 126 passes through the leg 116 of the mount portion 104 and extends from the top face surface or face 120 to the bottom face surface or face 122. The receiving portion 102 also has a top 130 and a bottom 132, as determined by the orientation of the top face 120 and bottom face 122 of leg 116. The receiving portion 102 is configured to be crimped onto wire or conductor 20.

Figure 2:
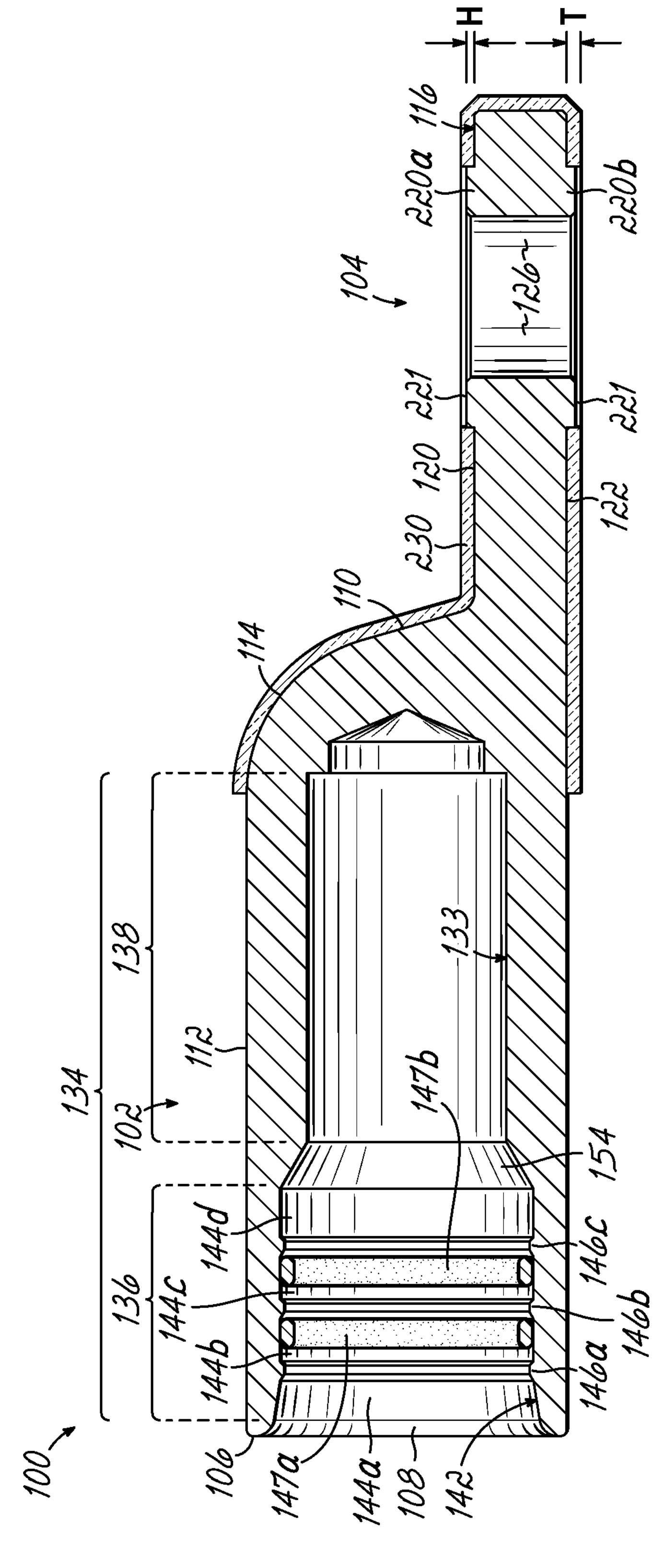
FIG. 2 is a cross-section embodiment of the terminal, as illustrated in FIG. 1.
Figure 2A:
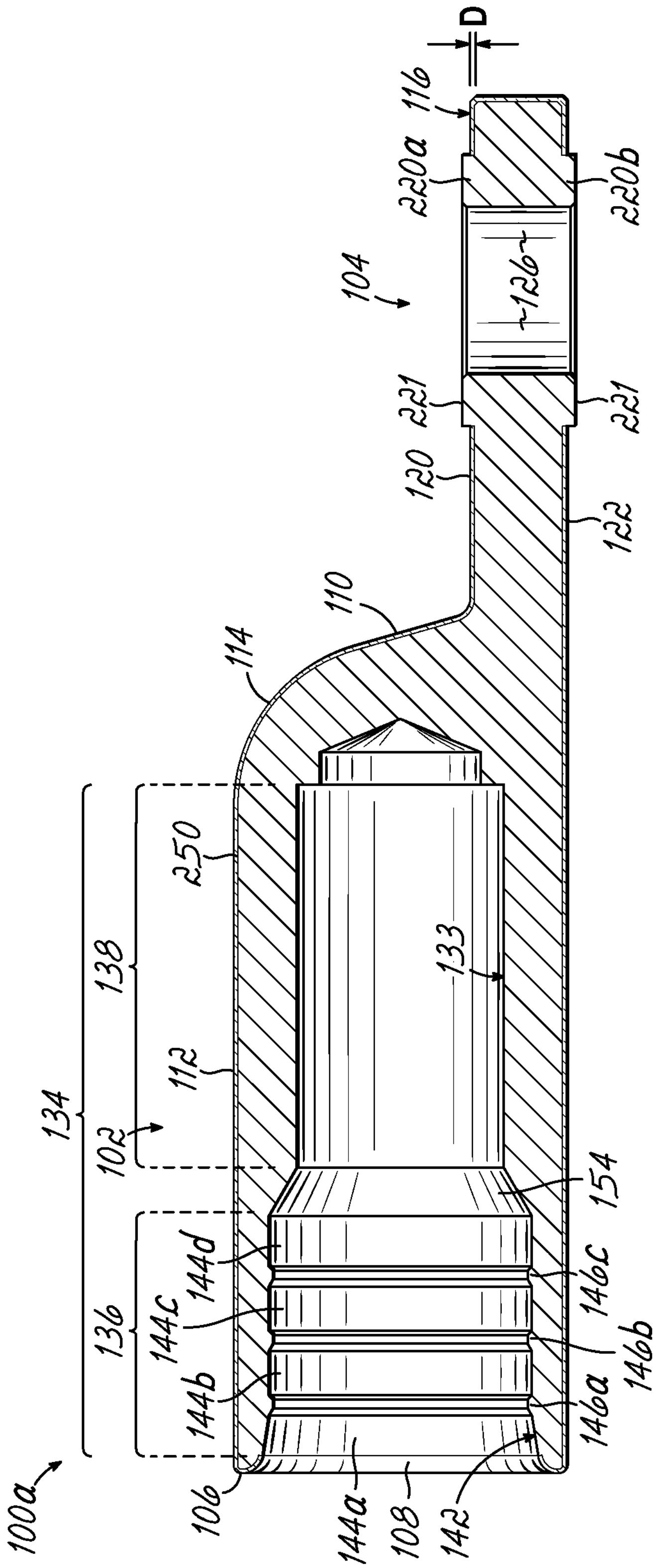
FIG. 2A is an alternative embodiment of the terminal, as illustrated in FIG. 1.

In accordance with one feature of the invention, the arc-resistant terminal 100 incorporates a leg or tongue 116 which has raised or elevated bosses 220*a*, 220*b* surrounding the aperture 126. The raised base is formed to surround the aperture on an opposing face surface. In a particular embodiment, the bosses are positioned both at the top face surface 120, and the bottom face surface 122 of tongue 116, as shown in FIG. 2. The bosses 220*a*, 220*b* are preferably integrally formed with the tongue 116 to extend above the respective face surfaces 120, 122 surrounding aperture 126. However, as shown in FIG. 2D, the one or more of the bosses 223*a*, 223*b* might be configured as a separate element that is used in conjunction with and mounted with the tongue 116 to provide the present invention and advantages thereto.

Referring to FIG. 2, the height H of a boss 220*a*, 220*b* may be in the range of 0.001 inch to 0.125 inch above a respective face surface 120, 122. The bosses surround the aperture and in illustrated embodiments the bosses are generally circular around aperture 126 to surround the aperture. The bosses may have other shapes as well to surround the aperture 126. In the illustrated embodiment, the outer diameter D of the circular boss may be in the range of 0.050 inches larger in diameter than the aperture 126 and up to the full width of the tongue 104. Optimally, the diameter D is the same or greater than the size of the washer 229 under a nut 228. The size of the bosses will depend on the overall size of aperture 126, and the gauge of the stud or bolt 222 extending through aperture 126, as illustrated in FIG. 3. Generally, the bosses provide suitable electrically conductive surfaces 221 that form an electrical connection with a terminal bar or block 224, or other connection point structure to which the cable assembly 101 and terminal 100 are coupled. The bosses 220*a*, 220*b* are configured and sized to provide sufficient connection to the metal areas on a terminal block, other terminal, or connection point to which the terminal 100 is secured. For example, the bosses might be configured and sized based on the size of a post 222 and respective nut 228 and washer 229 combination (See FIG. 3 or 8A, 8B.). FIG. 3 illustrates a nut and washer combination for securing the tongue. A lock washer (not illustrated) or a specifically designed lock nut might be implemented in the securing arrangement for further securing the tongue in place. The size of the washer 229 and boss 220*a, b* is selected to ensure good electrical contact. The outer range of the diameter of the boss is generally less than the width of the tongue 104, to allow more insulation between the boss and the edge of the tongue 104.

In accordance with another feature of the invention, the tongue 116 and at least some of the receiver portion 102 of the terminal are covered with a layer of insulation material in the form of a coating for increasing the arc resistance of the terminal. (see FIG. 9, for example) The layer of insulation material or coating is configured to cover a significant portion of the exposed terminal 100, leaving only the respective bosses 220*a*, 220*b* exposed or free from the layer of insulation material for a suitable electrical connection through the terminal.

In one embodiment of the invention, the tongue 116 and part of the wire receiving portion 102 is covered with a layer or coating 230 made of a dielectric insulation material. In other embodiments, greater portions of the terminal have the insulation material coating layer formed thereon, and in some the entire terminal has the coating layer thereon. The coating of dielectric insulation material extends over the tongue, leaving only the respective bosses 220*a*, 220*b* free from the layer 230.

The dielectric insulation material layer or coating 230 has desirable dielectric properties, and may include a material selected from one or more of the following: a fluorocarbon material (e.g., PTFE, PFA, FEP, ETFE, etc) a polymer material, PVC, polyurethane, a thermoplastic material, a phenolic material, silicone, rubber, a ceramic or some other material that provides dielectric protection, and/or sealing protection from fluid or vapor leakage as well as arc track protection along the insulation material surface or between conductive surfaces on and near the terminal. Also a combination of such materials might also be used for forming layer 230. Referring to FIG. 2A, a layer 250 might also be formed by a chemical conversion process to form a conversion coating, as discussed herein.

The layer 230 is appropriately applied on at least a portion of the tongue 116, and particularly, the entire tongue 116, and also a portion of the wire receiving portion 102, thus, leaving only the bosses 220*a*, 220*b* exposed. In one embodiment of the invention, a coating of dielectric material is applied to and formed on terminal 100 by an appropriate application process. The application process may include any appropriate process and might include a spray-on process, a dip process, or a mold process. An applied dielectric insulation material coating 230, as illustrated in FIG. 2, may have a thickness T of approximately 0.001 inch to 0.250 inch.

In one embodiment of the invention, the dielectric insulation coating 230 may have a thickness T similar to the overall height H of the bosses. In that way, the coating in combination with the respective boss will provide or define the top face surface 120 and bottom face surface 122 of the tongue 116.

In another embodiment of the invention the dielectric insulation coating 230 may have a thickness T that is less than the overall height H of the bosses.

In a more particular embodiment, as illustrated in the Figures, the coating 230 is dimensioned with a thickness T that is greater than the height H of the bosses 220*a*, 220*b*. In that way, as illustrated in FIGS. 3, 8A, 8B and discussed below, when the terminal 100 is secured to a terminal block or other connection point, and fastened down to contact the bosses, the coating 230 is slightly compressed down to the boss to seal the juncture at the bosses. By implementing an insulation material layer 230, an environmental seal is created at the juncture of the tongue and a terminal block or other connection point. Furthermore, the seal reduces or eliminates a galvanic reaction of the dissimilar metal of the terminal and some other surface.

One possible material for the dielectric insulation material coating 230 is an RTV silicone rubber available from Nusil Technology LLC of Carpinteria, CA A coating 230 may be sprayed onto the tongue 116 and surrounding area with the bosses 220 and aperture 126 appropriately masked or covered to keep a free electrically conductive surface. Alternatively, the coating 230 might be formed by dipping the tongue, again with the bosses and aperture covered. In still another alternative embodiment, a mold might be formed from the material that is then placed over or slid onto the tongue 116 to form coating 230.

In one embodiment, as noted, the height H of the bosses 220*a*, 220*b* is dimensioned so as to be less than or below the thickness T of the dielectric insulation coating 230. As illustrated in FIG. 3, when terminal 100 is positioned such that the post 222 of terminal block 224 extends through aperture 126, and the tongue 116 is fastened securely by an appropriate nut 228 and washer 229 (with a possible lock nut or lock washer, not shown) on post 222, the bottom surface of the washer 229 and the surface 232 of the terminal block 224 each compress the insulation coating adjacent to the outer perimeter or edges of the respective bosses in order to make good electrical contact with the bosses and terminal tongue 116 while sealing the respective interfaces between the tongue 116 and nut 228, and the tongue 116 and a conductive surface 232 of the terminal block 224. In that way, the structures of the respective bosses are sealed. In accordance with one aspect of the invention, this keeps the metal of the tongue 116 and the bosses 220*a* and 220*b* from being a point of arc, such as between adjacent terminals on a terminal block, or with other metal structures adjacent to the tongue 116.

Figure 15:
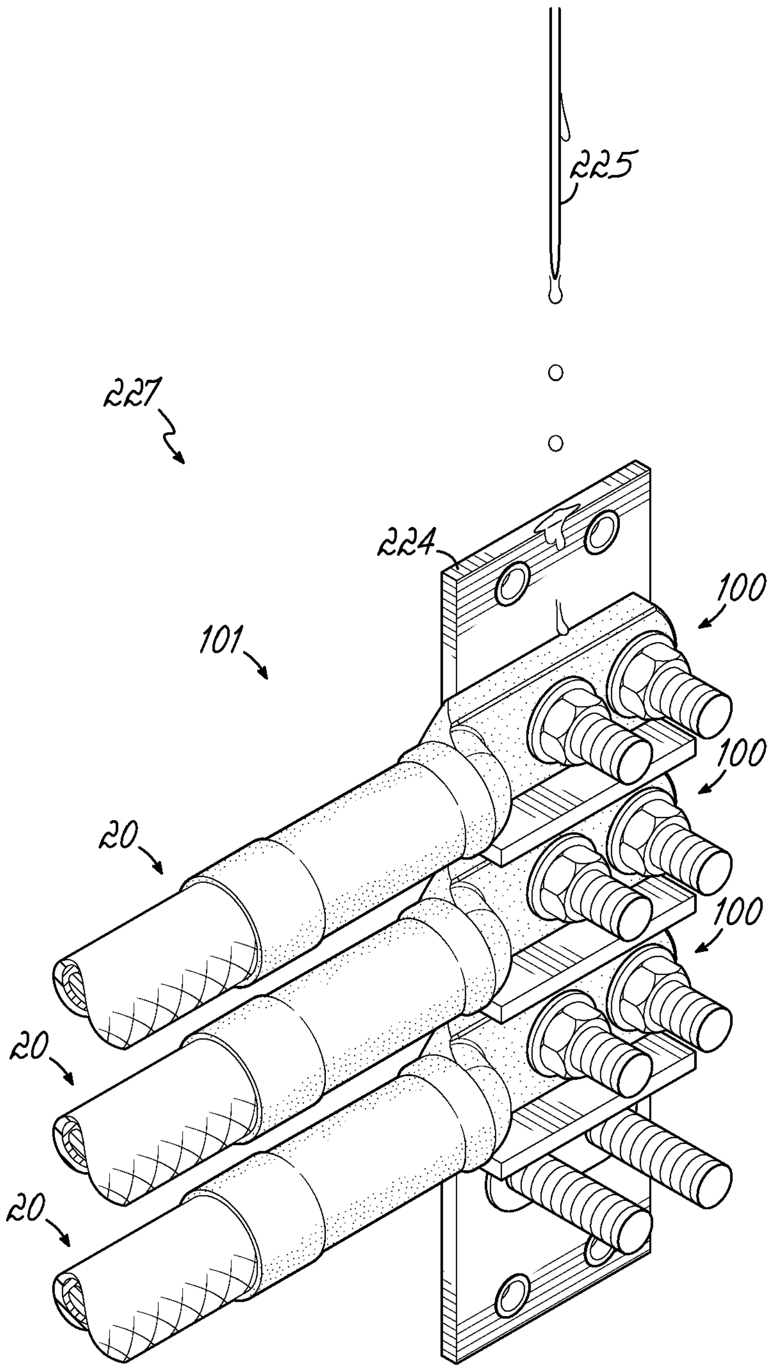
FIG. 15 is a perspective view of connection point terminals and cables in accordance with the invention illustrating a test arrangement.

The terminal of the present invention was found to provide significant improvements in arc resistance when tested versus conventional terminals. More specifically, for testing the inventive terminal and cable assembly, a 3% saline solution 225 was dripped onto a test arrangement 227, as illustrated in FIG. 15, wherein multiple cable assemblies 101 and terminals 100 were arranged next to each other on a terminal block 224. Utilizing conventional terminals, arcing occurred with significant damage to the terminals and cable assemblies as rapidly as fifteen seconds and up to 8 minutes upon application of the test. Alternatively, implementing the arc resistant design of the present invention, arcing was prevented or delayed for as long as eight hours, with only minor damage to the tongues 116 of the terminals 100. As such, the present invention provides a significant improvement over existing terminal equipment, and particularly over those arrangements which incorporate conventional cable assemblies and terminals connected very close together on a common terminal block.

Turning now to FIG. 2A, an alternative embodiment of the invention is illustrated, wherein terminal 100*a* incorporates a non-conductive conversion coating layer that is formed on the tongue 116 by a chemical conversion process. Specifically, as illustrated in FIG. 2A, through a chemical conversion process, a significant Depth D of the metal of the terminal is converted to a conversion coating layer 250 that is generally electrically non-conductive. The conversion coating layer 250 is formed on the electrically conductive material of at least a portion of the tongue for reducing the conductivity of the tongue portion. For example, an anodizing process might be used to form layer 250. Alternatively, another chemical conversion process might be used to form layer 250. Specifically, in one embodiment, a layer 250, such as an oxide layer, is formed on an aluminum terminal 100 through appropriate chemical conversion, such as by exposing the terminal 100 to an anodizing or chemical conversion process. In such a process, the bosses 220*a* and 220*b* and the aperture 126 are appropriately masked to prevent the conversion coating 250 from forming in that area so that the bosses and the aperture remain conductive for appropriate electrical coupling with a terminal bar, and threaded posts and nuts, as illustrated in FIG. 3. Generally, a conversion coating might be formed to a Depth D of around 2-3 mils, although other depths might be suitable as well.

Figure 2B:
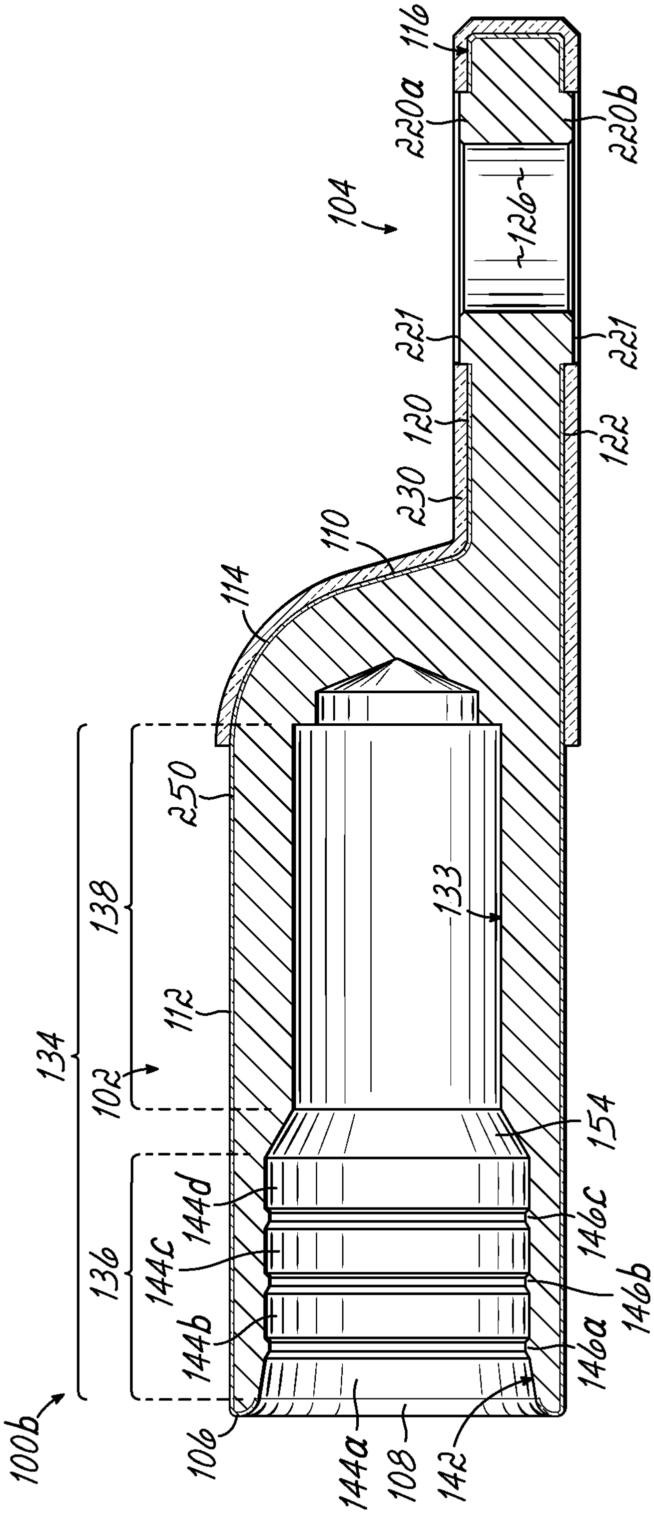
FIG. 2B is another alternative embodiment of the terminal, as illustrated in FIG. 1.

In accordance with still another embodiment of the present invention, as illustrated in FIG. 2B, an insulation material layer or coating 230 may be utilized in combination with a conversion coating layer 250 for the purposes of providing arc resistance in the terminal 100. Referring now to FIG. 2B, a terminal 100*b* is illustrated that incorporates both the combination of a conversion coating layer 250 that is formed on terminal 100*b*, as well as an insulation material layer 230 that is applied on the terminal and over layer 250. The combination of the two layers 230, 250 provides additional arc resistance, with respect to terminal 100*b*. The insulation material layer 230 is formed to overlap at least a portion of the conversion coating layer 250.

Figure 2C:
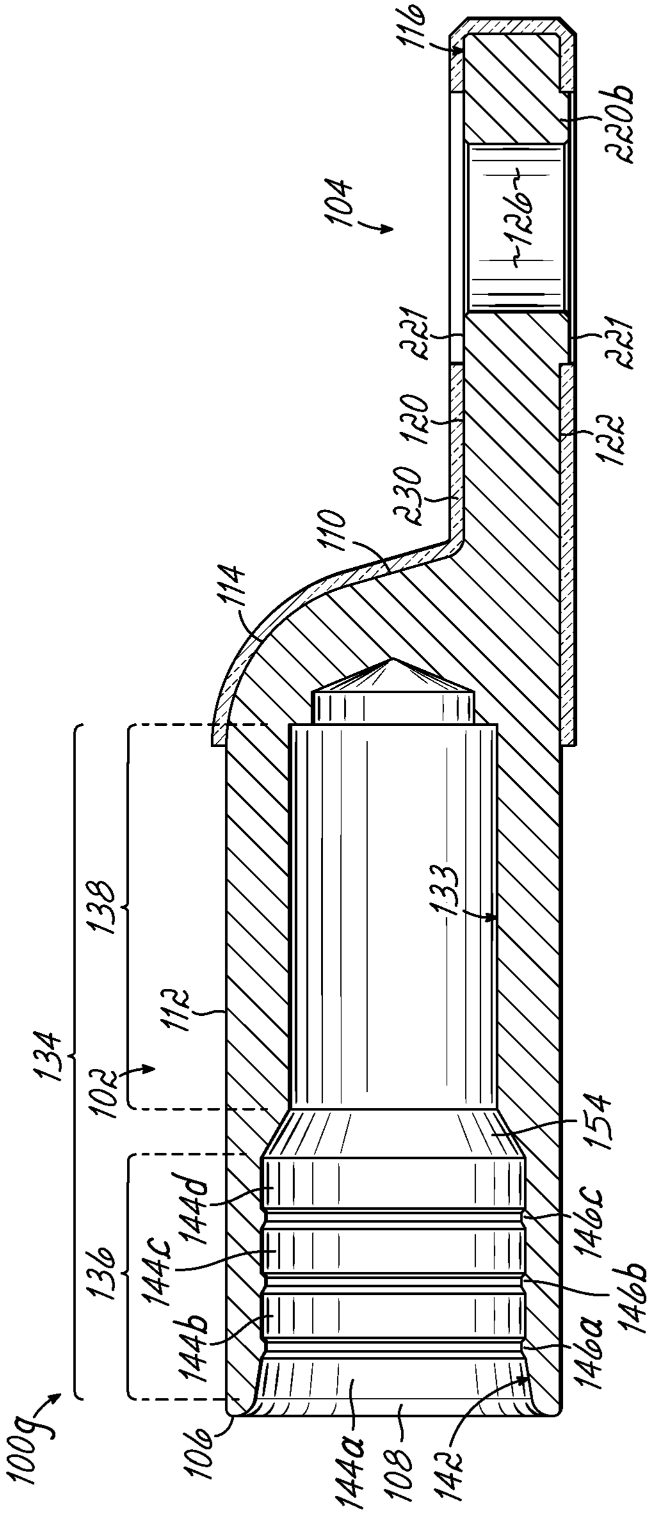
FIG. 2C is another alternative embodiment of the terminal.
Figure 2D:
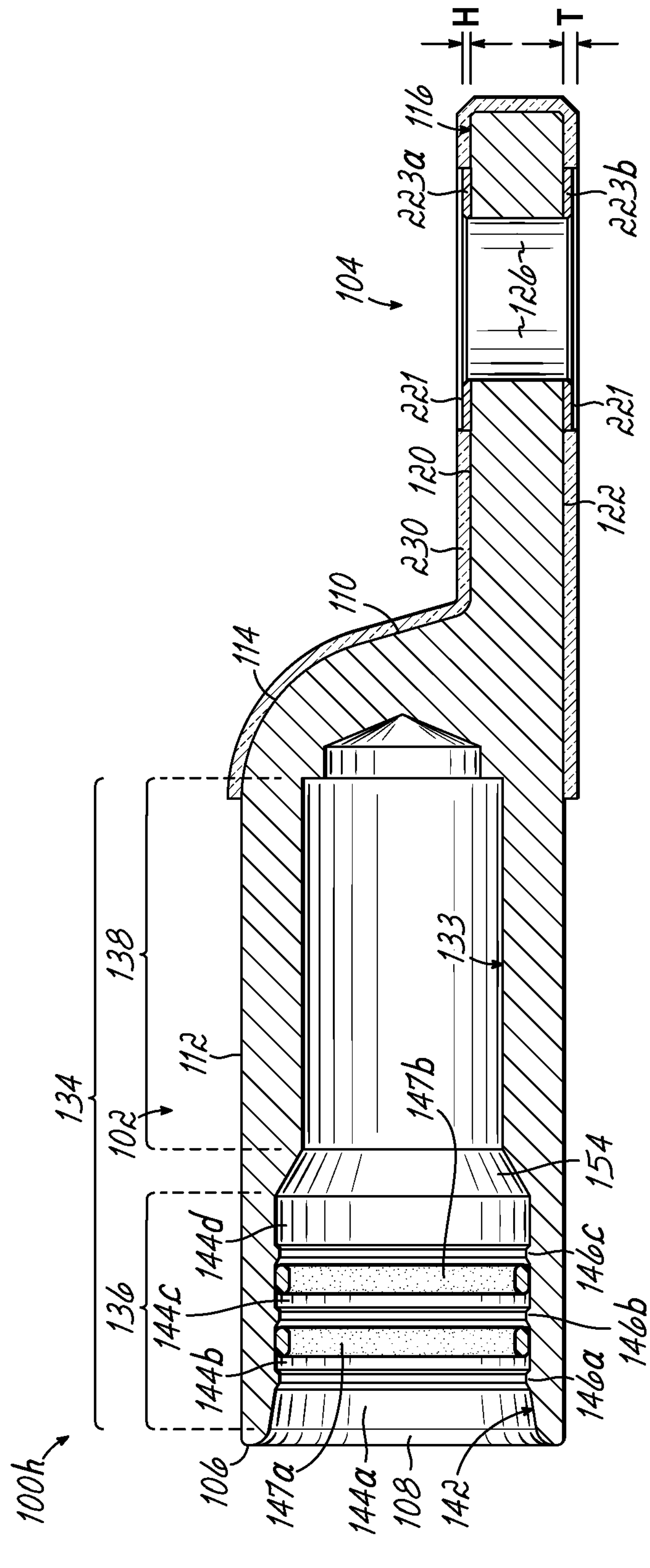
FIG. 2D is another alternative embodiment of the terminal.
Figure 14:
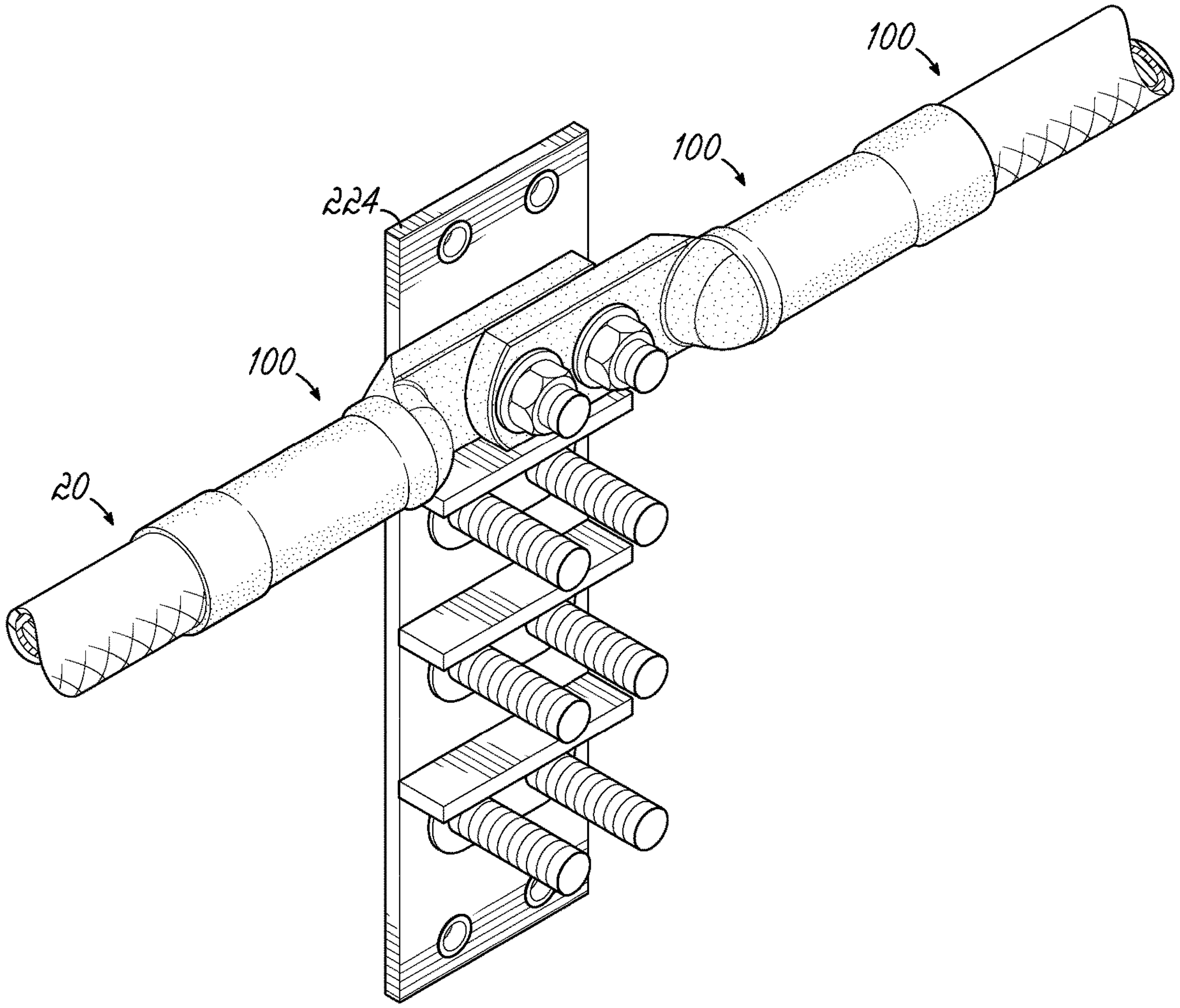
FIG. 14 is a perspective view of multiple terminals overlapping and connected in accordance with the invention.

FIG. 2C illustrates another embodiment of the invention wherein a boss is located on only one side of the terminal tongue 116. Specifically, it may only be necessary to secure the tongue to a conductive surface on one side and so a single boss, such as boss 220*b* as illustrated in FIG. 2C might be used. Boss 220*b* is located on a bottom side of the terminal 100*g* or tongue 116 so as to present a conductive surface to a conductive element or attachment point, such as terminal block 224 as shown in FIG. 3. In the embodiment of FIG. 2C, the top surface of the tongue 116 is generally flat. Generally, it is desirable to utilize a boss where the tongue is attached to a surface so as to provide a desirable and consistent electrical connection at that point. As illustrated in FIGS. 8B and 14, it may be desirable to attach multiple terminals together when securing them to an attachment point, and so bosses 220*a,b* on both the top and bottom of the terminal 100 may be used as shown in FIG. 2.

FIG. 2D illustrates a further embodiment of the invention. In several of the illustrated embodiments, the bosses 220*a, b* are illustrated as integral with or otherwise formed together with the structure of the tongue. In an alternative embodiment of terminal 100*h*, the boss 223*a, b* might be separately formed and then positioned around the aperture 126 of the tongue and used in conjunction with the tongue to realize the advantages of the invention. The bosses 223*a, b* would be similarly dimensioned and arranged and used as shown herein, in conjunction with a layer 230 or conversion coating layer 250 for realizing features and benefits of the invention.

Figure 4:
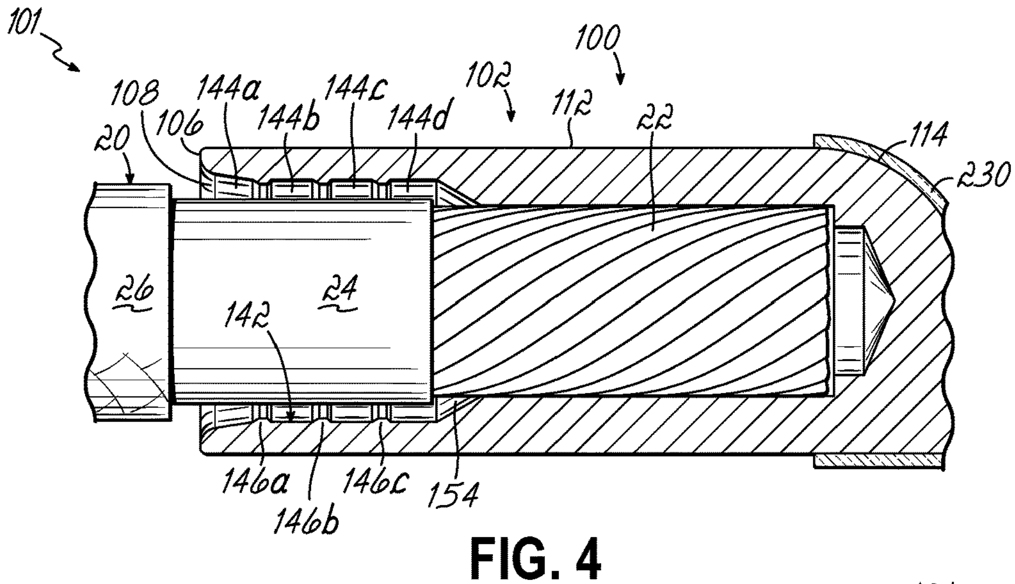
FIG. 4 illustrates a wire slid into a cross-sectioned embodiment of a terminal of FIG. 1 for illustrative purposes.
Figure 5:
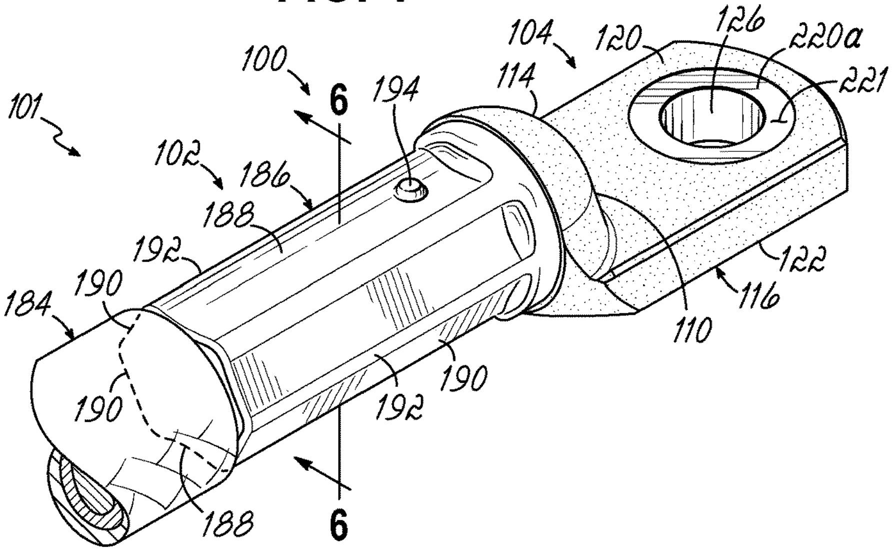
FIG. 5 illustrates an assembled and crimped embodiment of FIG. 4.
Figure 6:
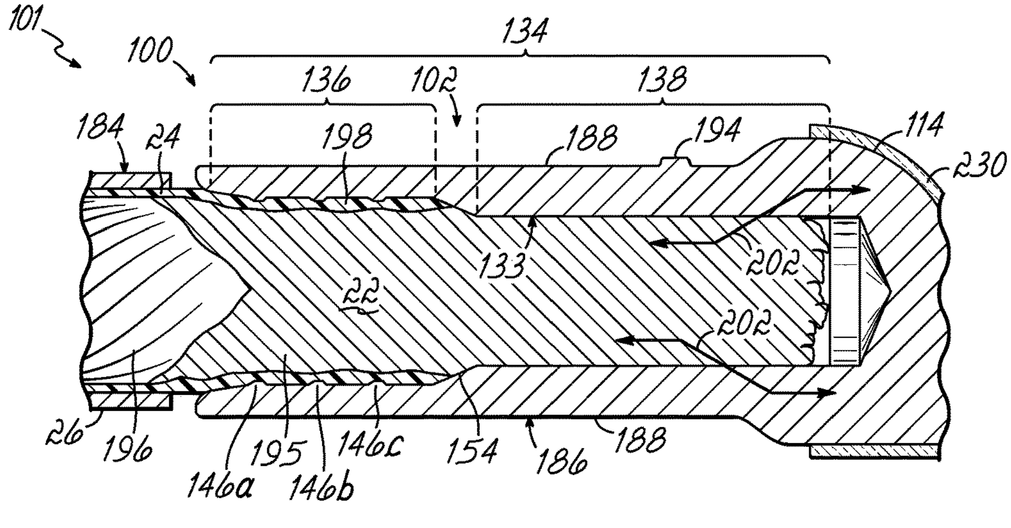
FIG. 6 is a cross-section of the embodiment, as indicated in FIG. 5.

With reference to FIGS. 5 and 6, the wire receiving portion 102 of the terminal 100 is configured to be crimped to form a cable assembly 101, and has a continuous annular interior wall 133 forming a crimp portion 134 (FIG. 6). In one embodiment of the invention, the crimp portion also seals the terminal in addition to making contact with conductor 22, and thus, comprises a seal portion or sealing portion 136 and a wire contact portion 138. The sealing portion 136 is adjacent to, and spaced from, the contact portion 138 toward aperture 108. In one embodiment, a sealing portion surface 142 is broken into four areas 144*a, b, c, d*, as defined by three integral seal rings 146*a, b, c* protruding radially inward from the surface 142 as illustrated in FIG. 4. In this embodiment the four areas 144*a, b, c, d* all measure substantially the same diameter, however in other embodiments the diameters may be different. Similarly, the seal rings 146*a, b, c*, having a smaller diameter than the diameter of the four areas 144*a, b, c, d*. The seal rings are illustrated with substantially the same diameter, however in other embodiments the diameters may be different. It is also contemplated that there may be more than or fewer than the three illustrated seal rings. A transition section 154 is positioned between the seal or sealing portion 136 and the contact portion 138. The transition section 154 guides the conductor 22 of the wire 20 from the larger sealing portion 136 into the contact portion 138, when the wire 20 is inserted into the terminal 100. Suitable wire terminal crimp portion configurations for use with the present invention are disclosed in U.S. patent application Ser. No. 14/010,073, filed Aug. 26, 2013, entitled "TERMINAL/CONNECTOR HAVING INTEGRAL OXIDE BREAKER ELEMENT", which Application is a Continuation-in-Part Application of U.S. patent application Ser. No. 12/371,765, filed Feb. 16, 2009, entitled "TERMINAL/CONNECTOR HAVING INTEGRAL OXIDE BREAKER", now Issued U.S. Pat. No. 8,519,267, issued Aug. 27, 2013, which application and patent are incorporated herein by reference in their entireties.

The terminal 100 of the invention may be used for forming a wire or cable assembly 101 (FIG. 1), and the wire 20 is inserted in the terminal 100 so that the conductor 22 is guided by the section 154 into the contact portion 138. The three seal rings 146*a, b, c* surround the insulation sheath 24, and the contact portion 138 surrounds the conductor 22 of the wire. The assembly 101 is placed in a suitable crimping die, such as a modified hex crimping die, and crimped to make a cable 184 with a crimp 186. (FIG. 5). The crimp 186 comprises 2 opposing concave facets 188 and four straight facets 190. Between the facets are six corners 192. On one of the concave facets 188 is an indicator button 194. The indicator button 194 will be properly formed if the wire 20 was properly inserted and crimped.

Internally, as illustrated in FIG. 6, the conductor 20 is squeezed together tightly at 195 in the sealing portion 136 and contact portion 138, as compared to the portion 196 outside of the terminal 100. The sealing rings 146*a,b,c* are squeezed into the insulating sheath 24 to make a hydrostatic seal 198. The contact portion 138 is squeezed into the conductor 22 to give the assembly 101 a conductive electrical path 202 between the receiving portion 102 and the wire 20.

In accordance with one embodiment, the sealing might be enhanced by implementing flexible seal rings along with the seal rings 146*a*-146*c*. Specifically, as illustrated in FIG. 2, one or more flexible seal rings 147*a*, 147*b* might be implemented in one or more of the areas 144*a*-144*d* that are provided between the seal rings 146 of the sealing portion 136.

For example, as illustrated in FIG. 2, flexible seal ring 147*a* is positioned between and adjacent to rings 146*a* and 146*b*, while flexible seal ring 147*b* is positioned between and adjacent to rings 146*b* and 146*c*. The flexible seal rings 147 are formed of a suitably flexible material and are deposited in the appropriate spaces 144, and would generally take up less than the space or volume between the seal rings 146. Each of the flexible seal rings 147 is preferably formed continuously for 360° around the surface of the sealing portion 136. The flexible seal rings 147 are flexed when the wire receiving portion is crimped, as noted herein for forming a complete wire assembly or cable 101 using an appropriate wire.

Once the terminal 100 has been crimped to a wire, a suitable insulative sleeve might be placed over the crimp portion 134 and appropriately shrunk or secured over portion 134 and part of the wire 20, as illustrated in FIG. 15 to further insulate the crimped metal of the terminal at the wire 20.

Figure 7:
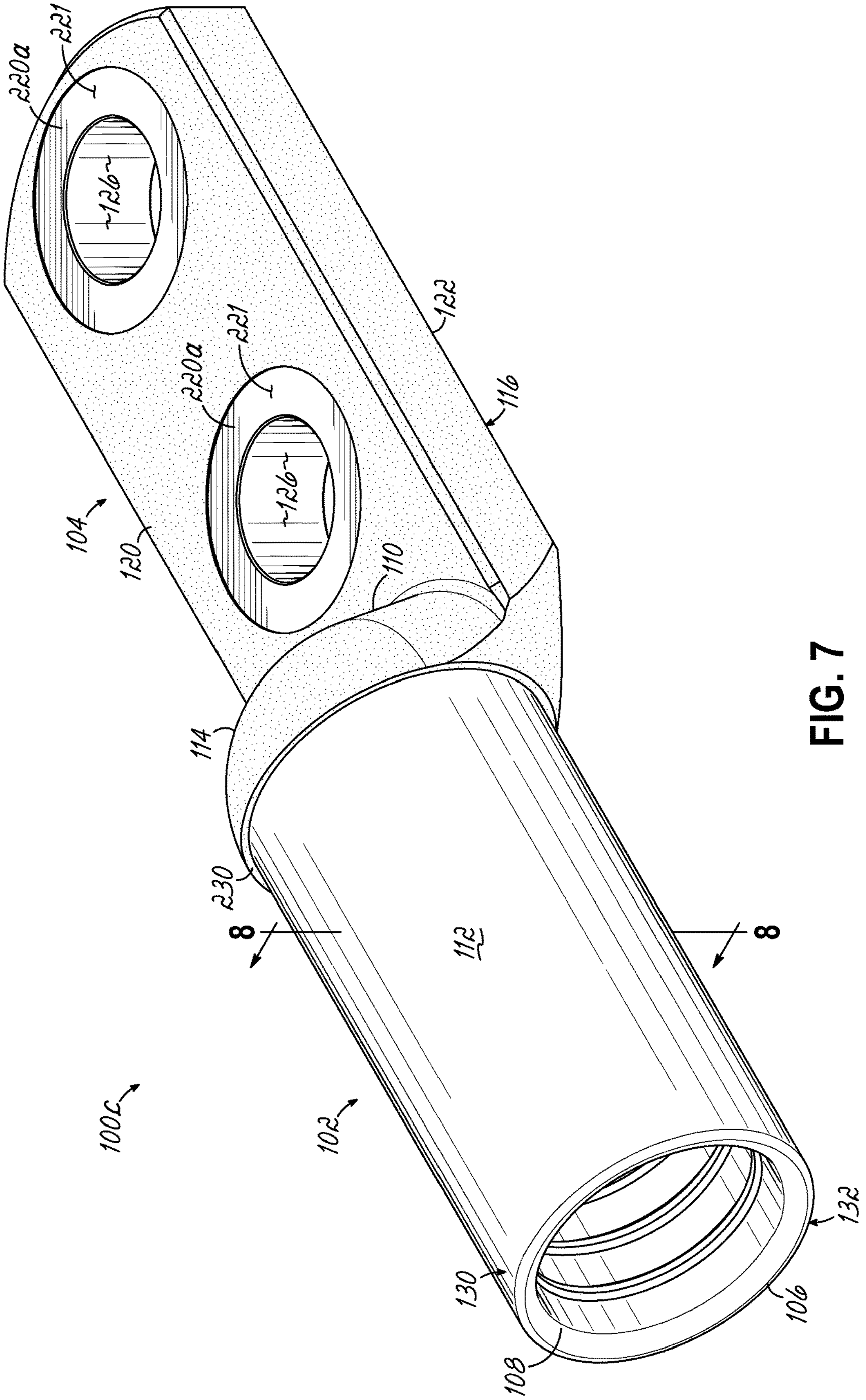
FIG. 7 is a perspective view of another alternative embodiment of a terminal of the invention.
Figure 10:
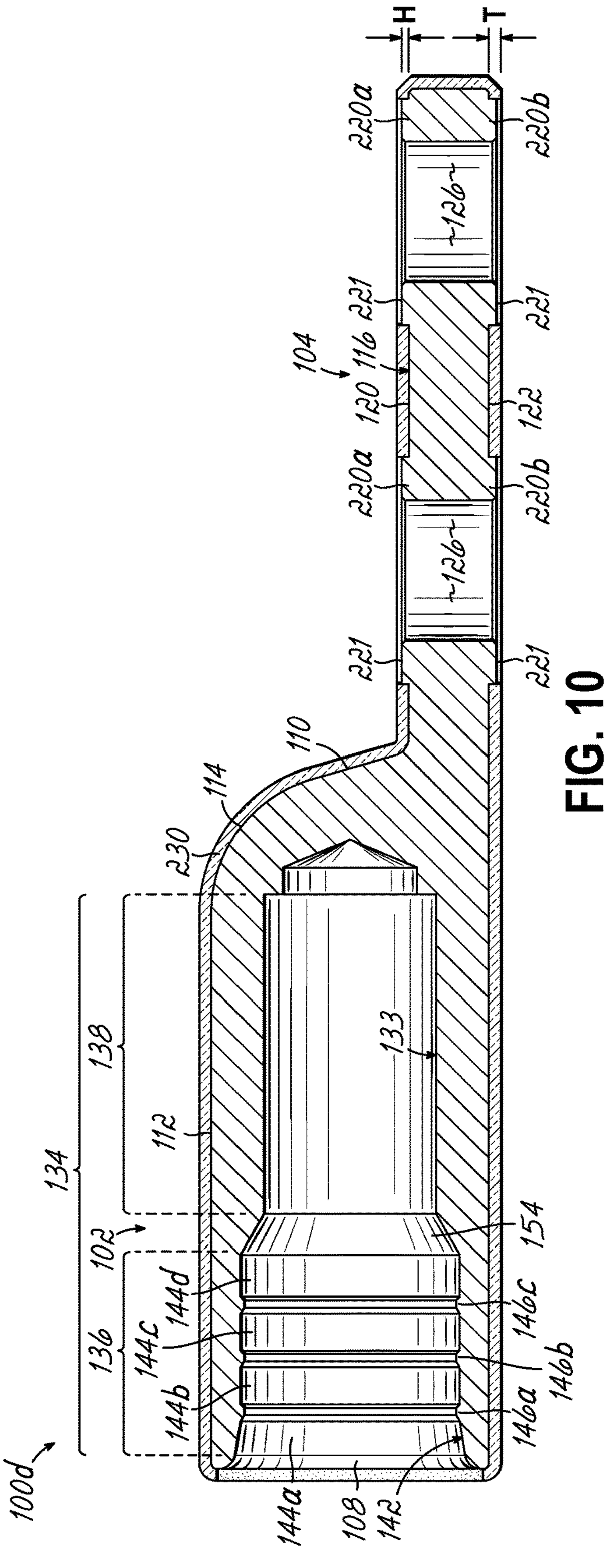
FIG. 10 is a cross-sectional view of the embodiment of FIG. 9.
Figure 11:
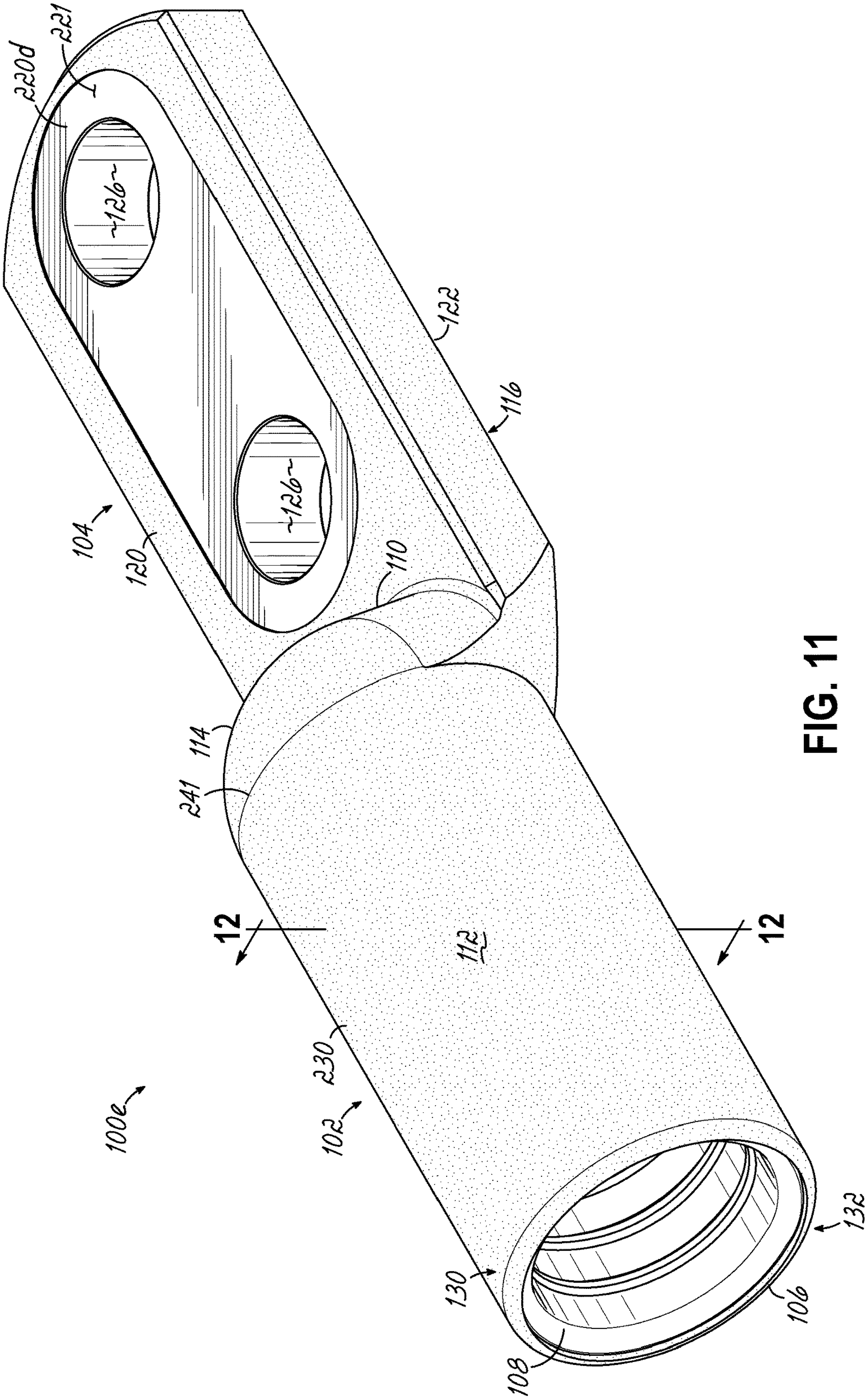
FIG. 11 is a perspective view of another alternative embodiment of a terminal of the invention.
Figure 12:
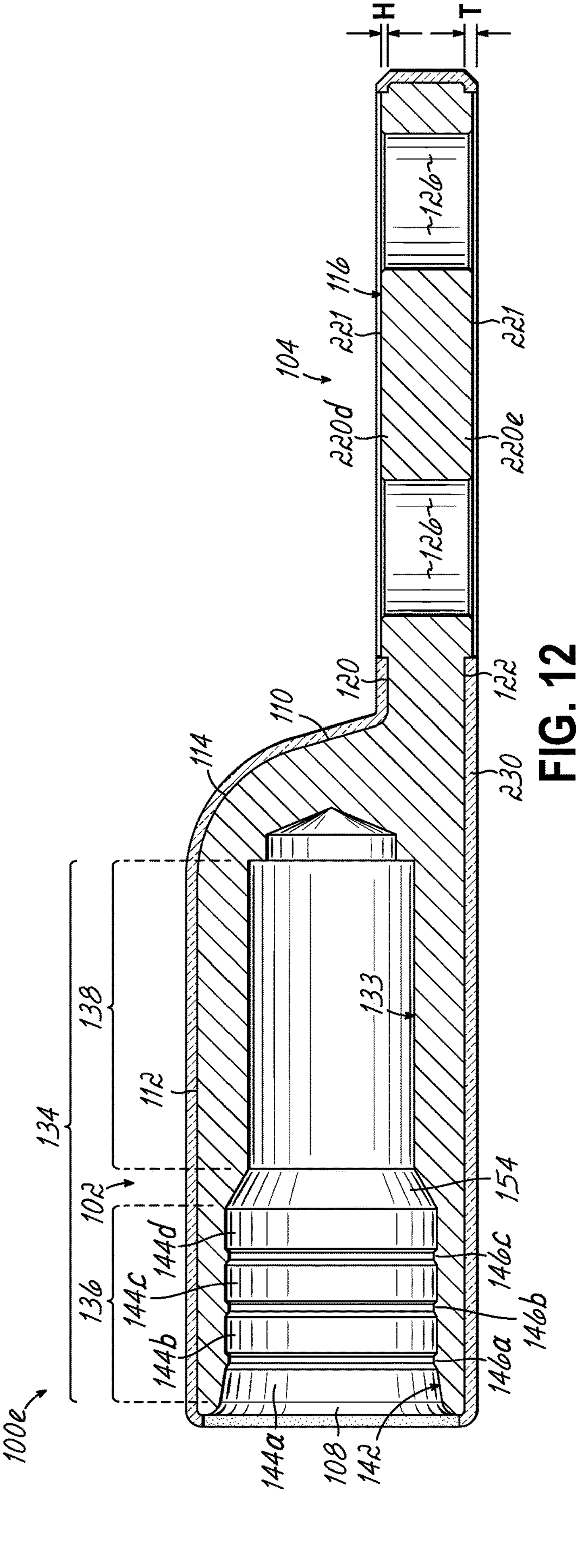
FIG. 12 is a cross-sectional view of the embodiment of FIG. 11.

FIGS. 7-12 illustrate additional alternative embodiments of the invention incorporating the arc-resistant features of the invention. Specifically, those figures illustrate different terminal alternatives with the tongue having multiple apertures, having multiple bosses similar to those illustrated in FIGS. 1-3, or having a single elongated boss for multiple apertures. Furthermore, those embodiments illustrate various configurations involving insulation material layers. It should be readily understood that, for each of the embodiments as illustrated in FIGS. 7-12, different combinations of applied dielectric insulation material layers or coatings, conversion coating layers, and combinations thereof, might be utilized similar to the embodiments, as illustrated and described with respect to FIGS. 1-3. Therefore, while FIGS. 7 and 12 illustrate just the use of an applied dielectric insulation material layer 230, those embodiments could as well utilize only a conversion coating layer 250 as described or also might be implemented with a combination of both a conversion coating layer 250 and an insulation material layer coating 230 that is applied over the conversion coating layer. Accordingly, the present invention is not limited only to those specific combinations illustrated in the figures and other combinations of terminals and layers/coatings are covered.

Turning now to FIG. 7, a terminal 100*c* is illustrated that has a tongue 116 having multiple apertures 126. Each of the apertures has corresponding bosses 220*a*, 220*b*, as illustrated in FIG. 8 surrounding a respective aperture on a face surface of the tongue. The embodiment of FIGS. 7 and 8 illustrate a material layer insulation 230 applied over the tongue 116 and over the transition area 114 transitioning into contact portion 138 of the wire receiving portion 102 of terminal 100*c*. As noted herein the bosses 220*a*, 220*b* will have a particular height H with respect to the face surfaces 120 and 122, which is slightly less than the overall thickness T of the dielectric insulation material layer 230 for providing desirable sealing features, as noted herein.

To that end, FIG. 8A illustrates the terminal 100*c* as incorporated with a terminal block 224 having appropriate posts 222 and nuts 228 and washers 229 for physically and electrically coupling the terminal to the terminal block. As noted herein a lock washer (not illustrated) or a nut 228 with locking features might also be utilized with the nut 228 and washer 229 for providing a robust electrical and mechanical coupling of the terminal with a mounting or connection point or structure. Multiple apertures 126 provide multiple points of contact with terminal block 224 or some other connection point.

In accordance with one particular use of the invention, the raised bosses 220*a, b* provide a robust electrical connection on both sides of the terminal 100 when the terminal is connected to a connection point or to another terminal. Referring again to FIGS. 8B and 14, the invention provides an ability to stack multiple terminals together and one on top of each other for the purposes of securing the terminals to a connection point. The raised bosses 220*a, b* abut against each other as shown in the FIG. 8B for providing a robust electrical connection. For example, the topmost boss 220*a* of a terminal would abut with the bottommost boss 220*b* of another terminal that sits on top of the first terminal as illustrated. Both terminals may then be secured such as with an appropriate nut 228, washer 229 (and any appropriate locking mechanism if desired). More than two terminals may be stacked as shown in FIGS. 8B, 14 depending on the shape of the terminal and the orientation.

Figure 9:
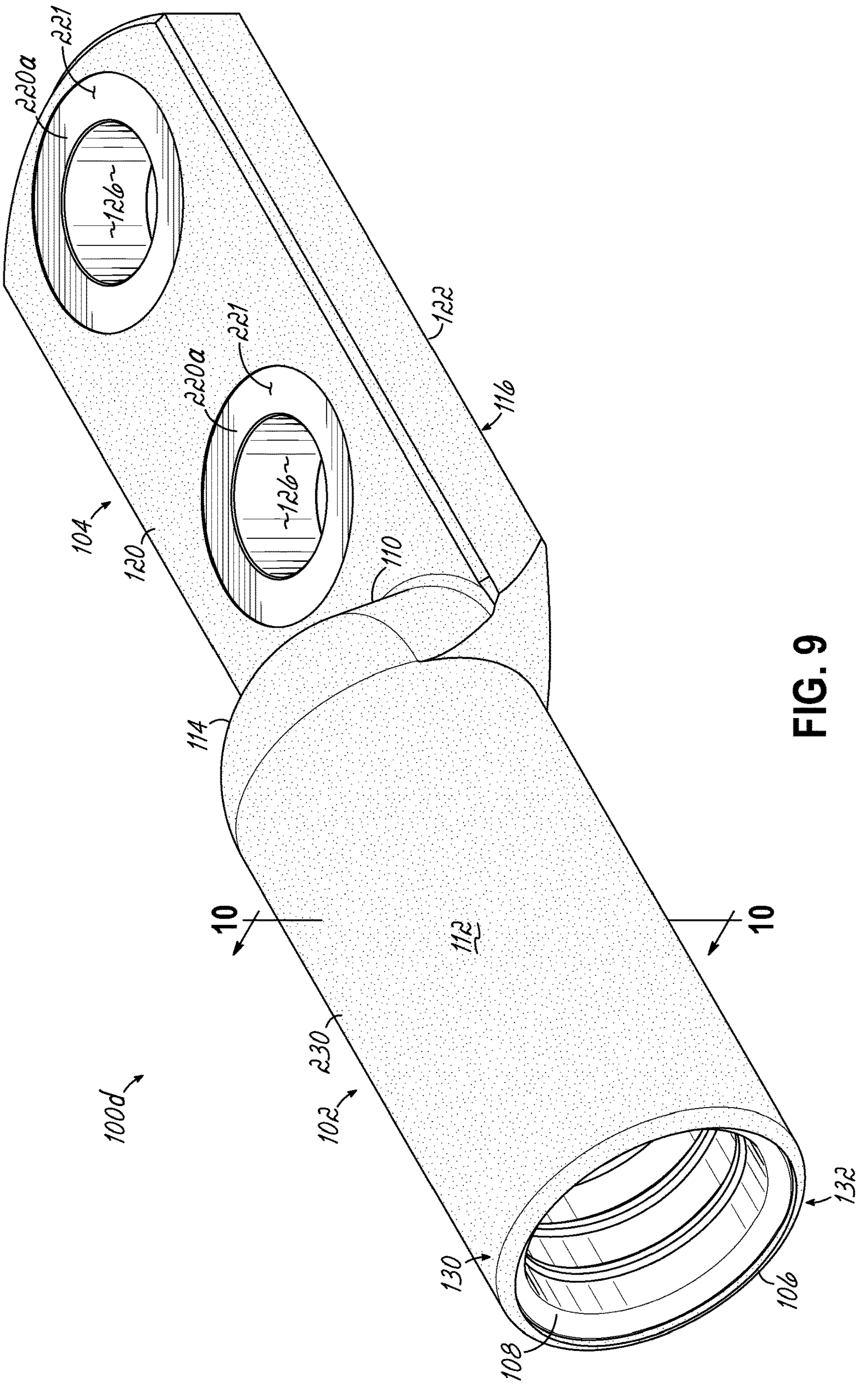
FIG. 9 is a perspective view of another alternative embodiment of a terminal of the invention.

FIG. 9 illustrates another alternative embodiment of the invention, wherein terminal 100*d* is almost completely covered with the dielectric insulation material layer. Specifically, terminal 100*d* has multiple apertures 126 similar to the embodiment of FIG. 7, and thus would be configured and would operate similarly to that embodiment, as illustrated in FIGS. 7-8A. The dielectric insulation coating 230 is applied along the length of terminal 100*d*. Thus, the layer 230 extends beyond the transition portion 114 transitioning from the tongue 116, up to the wire receiving portion 102, and extends over the length of the wire receiving portion 102, from the back face 110 out to the opening or aperture 108, as discussed with respect to FIG. 1. Accordingly, a greater portion of the exposed metal surfaces of the terminal 100*d* is covered with the dielectric insulation coating 230. The elevated or raised bosses 220*a*, 220*b* are left uncoated, and are appropriately masked when material to form layer 230 is applied. FIG. 10 illustrates a cross-sectional view of terminal 100*d* of FIG. 9.

In accordance with another embodiment of the invention, FIGS. 11 and 12 illustrate an embodiment of the invention as terminal 100*e*, wherein an elongated boss spans between multiple apertures 126. That is, for multiple apertures 126, rather than individual single bosses, a single boss spans between the apertures 126 and surrounds both apertures. Specifically, an elongated upper boss 220*d* and elongated lower boss 220*e* each span between the apertures 126. The bosses 220 *d, e* are free of the dielectric insulation material for the purposes of making electrical contact with an element, such as a conductive surface of a terminal block. As such, the bosses 220*d*, 220*e* are appropriately masked during the application of dielectric insulation material to form layer 230. For electrical contact with terminal 100*e*, surfaces or connectors might be used in a terminal block that are shaped similarly to the bosses 220*d, e* for a robust electrical connection. FIGS. 11 and 12 illustrate the dielectric insulation material layer 230 that extends the length of the tongue 116, as well as the length of the wire receiving portion 102. Alternatively, a layer 230, which primarily covers mostly just the tongue 116, might be implemented as illustrated in FIGS. 7-8. As such, in alternative embodiments, in combination with the conductive bosses, the layer 230 might not extend beyond the reference line 241, as illustrated in FIG. 11.

As discussed herein, the embodiments as illustrated in FIG. 7-12, may incorporate various combinations of conversion coating layer and/or insulation material layers. Similar to the insulation material layer 230 as illustrated in FIGS. 7-12, the conversion coating layers might also extend only over the tongue, or over the entire terminal, including tongue 116 and the wire receiving portion of 102 or over the tongue 116 and a part of the wire receiving portion 102 of the terminal. Such conversion coating layers might also be utilized in combination with the insulation material layer 230 that is used predominantly over the tongue 116, over the entire terminal or over the tongue and part of the terminal, as illustrated in FIGS. 9-11. Accordingly, the present invention is not limited to the specific embodiments only as shown in the figures, but may utilize various different combinations of the noted individual bosses 220*a*, 220*b*, and extended boss 220*d*, 220*e*, and/or the disclosed combinations of insulation material layers 230, and conversion coating layers 250.

Referring to FIG. 15, the unique combination of the insulated coating and the exposed bosses provides suitable metal contact surfaces on the top and bottom of the tongue for the purposes of an electrical connection, while also reducing and/or preventing arc tracking, as well as accidental electrocution from exposure to the terminals.

Figure 13:
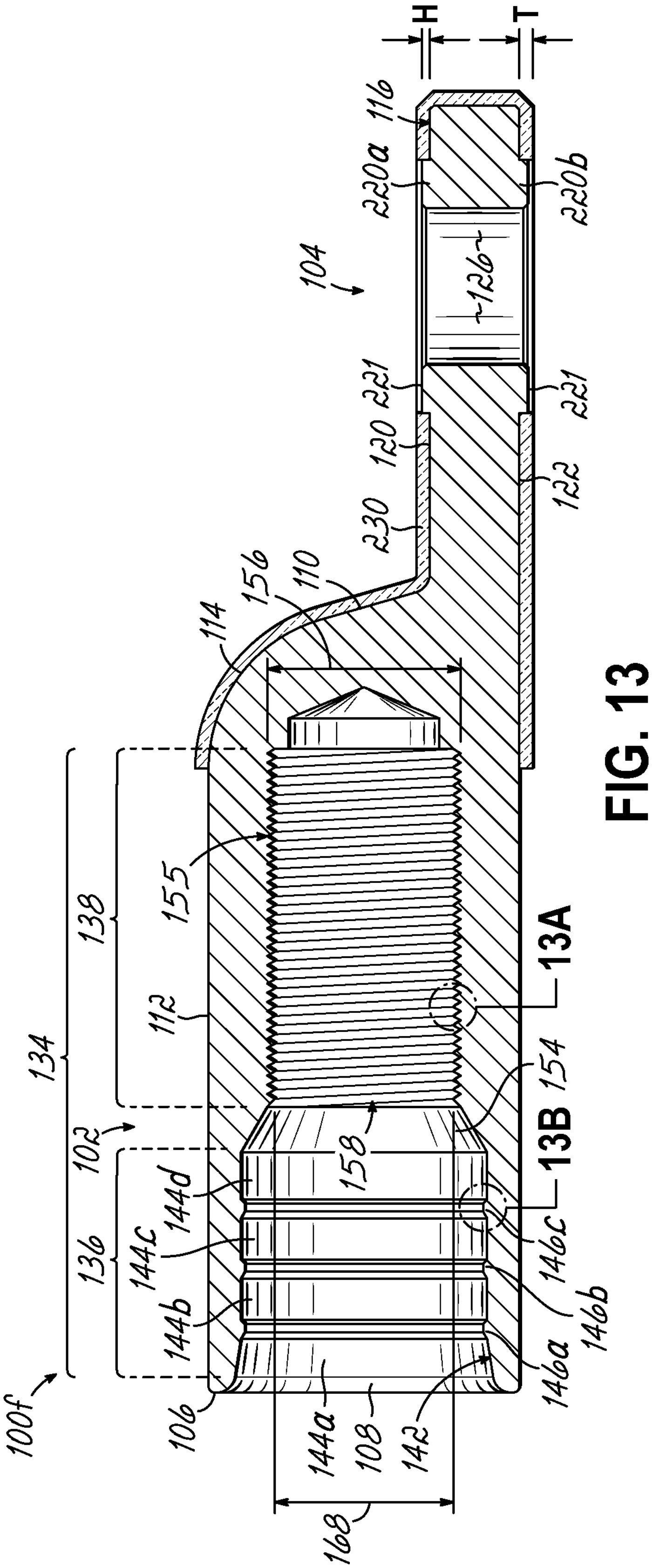
FIG. 13 illustrates a cross-sectional view of an embodiment of a terminal of the invention.
Figure 13A:
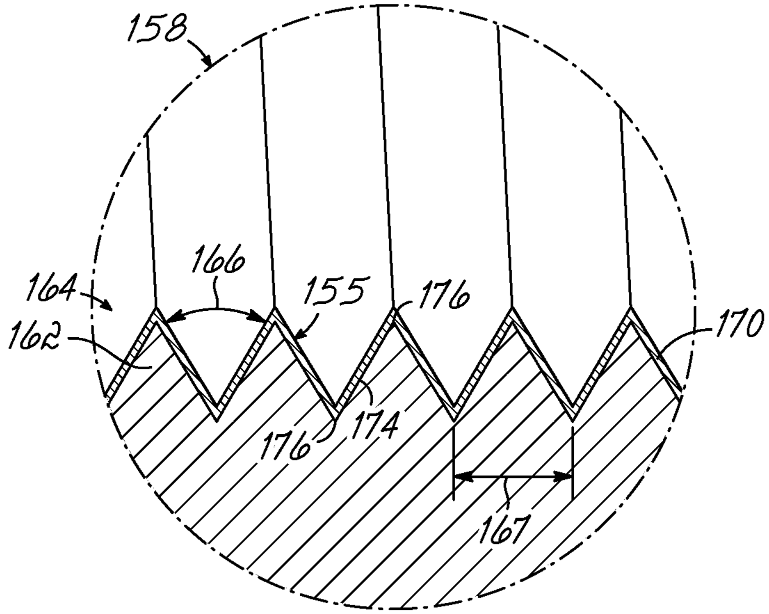
FIG. 13A is a detailed view of the embodiment as illustrated in FIG. 13.
Figure 13B:
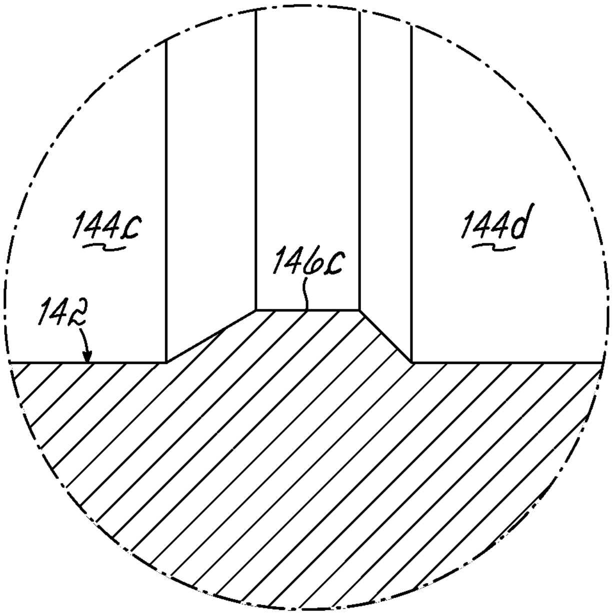
FIG. 13B is a detail view of the embodiment, as illustrated in FIG. 13.

FIGS. 13, 13A, and 13B illustrate another possible feature that might be utilized with the various terminals of the present invention. Specifically, the inventive terminals might utilize a structure within the wire receiving portion 102 of the terminal, and particularly, in the contact portion 138. To that end, the terminals might utilize an integral oxide breaker element for breaking through non-conductive oxide that may form on the surface of a conductor, such as an aluminum conductor.

The contact portion 138 has a continuous cylindrical wall 155 with a major diameter 156 and an integral oxide breaker or oxide breaker element 158, the term this application will use for the macro object that breaks through the oxide layer on the conductor 22 when the wire receiving portion is crimped.

The integral oxide breaker element 158 comprises a plurality of protrusions, such as tapered protrusions 162, extending radially inward from the major diameter 156 of the contact portion 138. The protrusions are configured to engage the conductor of a wire positioned in the contact portion, and to protrude into the wire when the wire receiving portion is crimped. These tapered protrusions 162 may be separate from each other, but in other embodiments, for ease of manufacture, these tapered protrusions 162 are in the form of a helical thread 164 (FIGS. 13A, 13B) that is conveniently manufactured on metal cutting or forming equipment. In one embodiment the thread 164 has a sixty degree included angle 166 and a pitch 167 of eighty, and is 0.008/0.010 inch deep. A pitch 167 of sixty has also worked successfully. It is contemplated that other included angles 166 and pitch 167 combinations as well as depths would also work. A minor diameter 168 of the threads equal to 0.481+/−0.002 inch has been used for wire gauge 2/0. The oxide breaker 158 further comprises a coating 170 on the protrusions 162. In various embodiments, the oxide breaker and the structures forming same might be coated with a material layer or left uncoated. In one particular embodiment, the coating 170 is an electroless nickel plate of 0.0005+/−0.002 per ASTM B733 Type III. This may be successfully put in the blind hole (blind refers to a hole with only one aperture 108) by using an appropriate coating process. In addition to nickel, other coatings might be utilized and include electro nickel, gold, silver, tin and tin-lead, and alkaline-bismouth-tin.

The structure of the oxide breaker element provides not only the ability to break through the oxide layer on the conductor strand, but also improves the electrical and mechanical features of the invention. For example, electrically, the construction of the oxide breaker element increases the surface area of the crimp, and the contact with the conductor, to improve the overall electrical properties of the connection in the transition from the wire to the terminal. Furthermore, the oxide breaker element 158 increases the grip function at the contact portion 138, and increases the pull force necessary to remove the wire 20 from terminal 100.

It is also contemplated that other forms of structures or elements might be used for the oxide breaker element 158, for example discrete annular protrusions might also be used. The making of one or more spiral threads is a widely perfected and efficient process. Other possible features and oxide breaker elements for use with the inventive terminals are discussed further in U.S. patent application Ser. No. 14/010,073, filed Aug. 26, 2013, entitled "TERMINAL/CONNECTOR HAVING INTEGRAL OXIDE BREAKER ELEMENT", now Issued U.S. Pat. No. 9,385,449, issued Jul. 5, 2016 which Application is a Continuation-in-Part Application of U.S. patent application Ser. No. 12/371,765, filed Feb. 16, 2009, entitled "TERMINAL/CONNECTOR HAVING INTEGRAL OXIDE BREAKER", now Issued U.S. Pat. No. 8,519,267, issued Aug. 27, 2013, which patents are incorporated herein by reference in their entireties.

Figure 16:
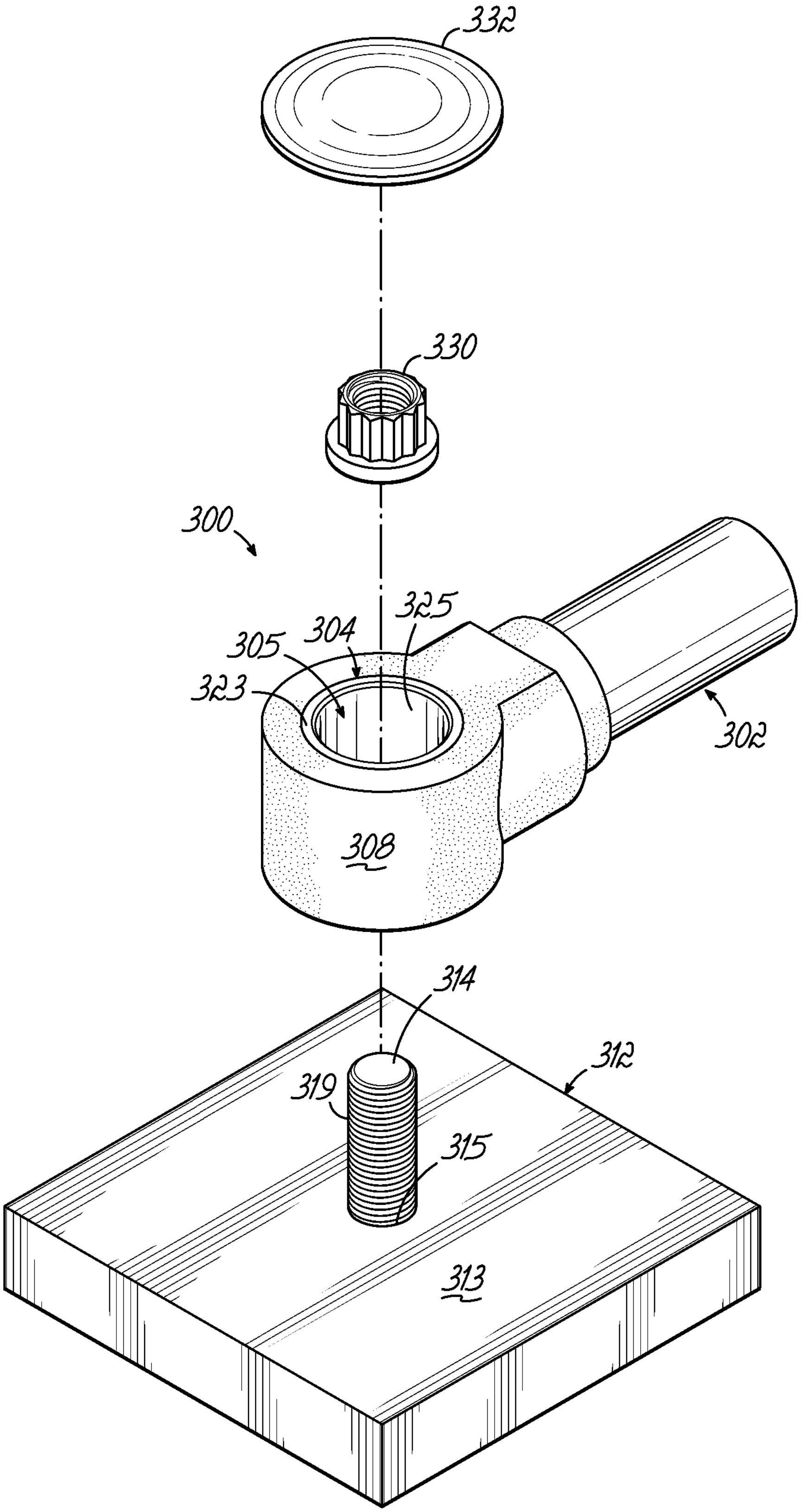
FIG. 16 is an exploded perspective view of a terminal system in accordance with another embodiment of the invention.
Figure 17:
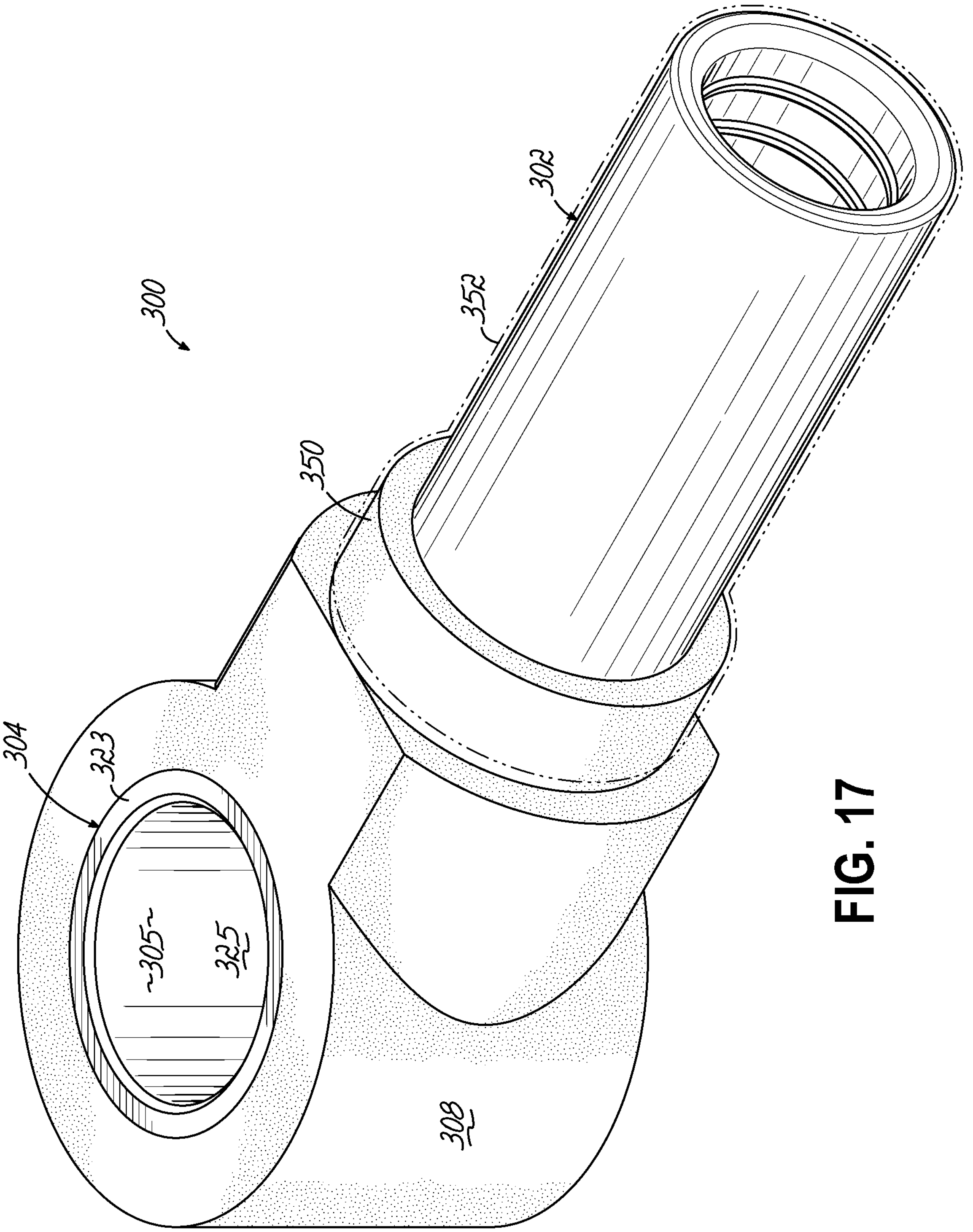
FIG. 17 is a perspective view of a terminal in accordance with the embodiment of the invention in FIG. 15.
Figure 17A:
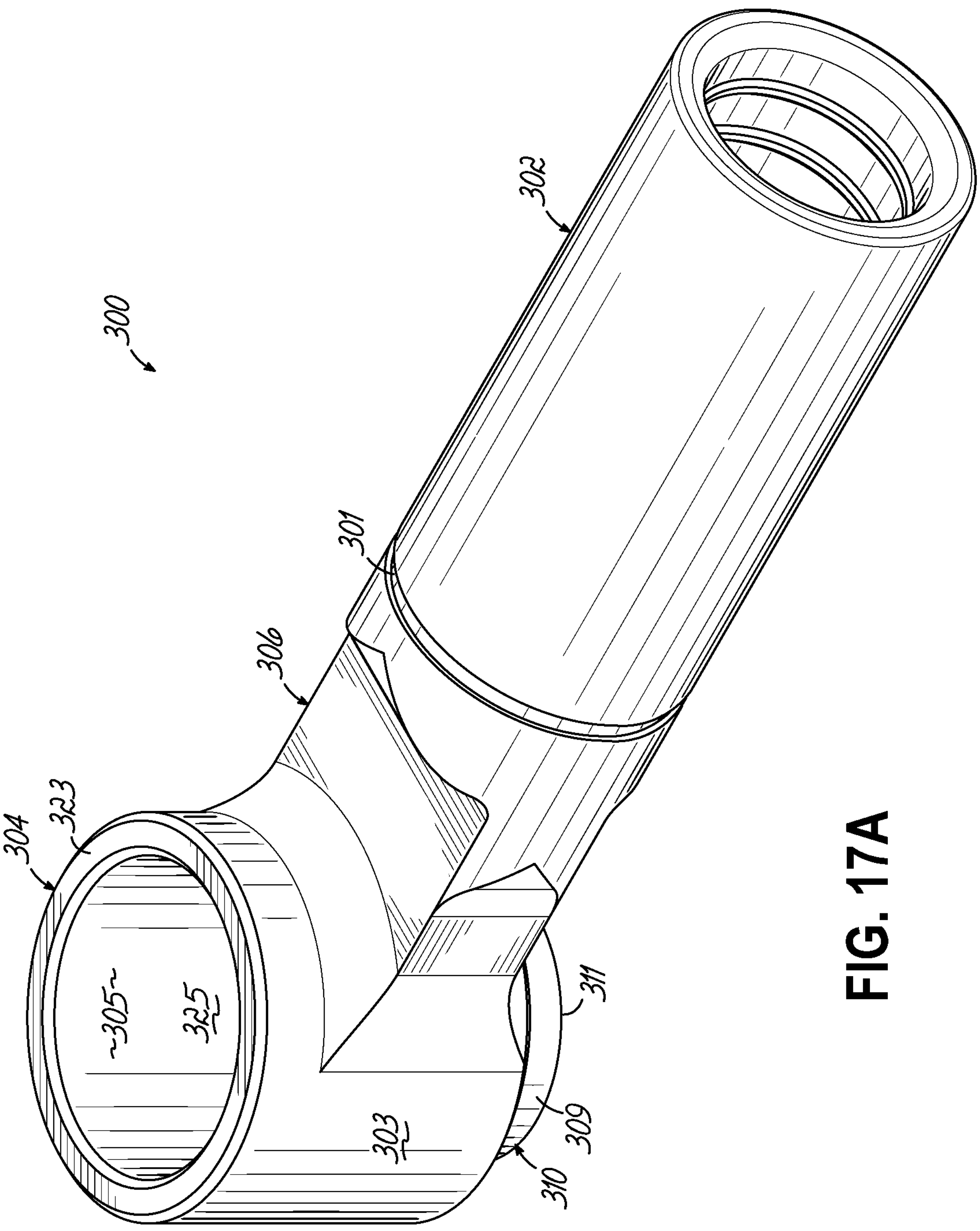
FIG. 17A is a perspective view of a terminal without an overmold structure in accordance with the embodiment of the invention in FIG. 15.
Figure 18:
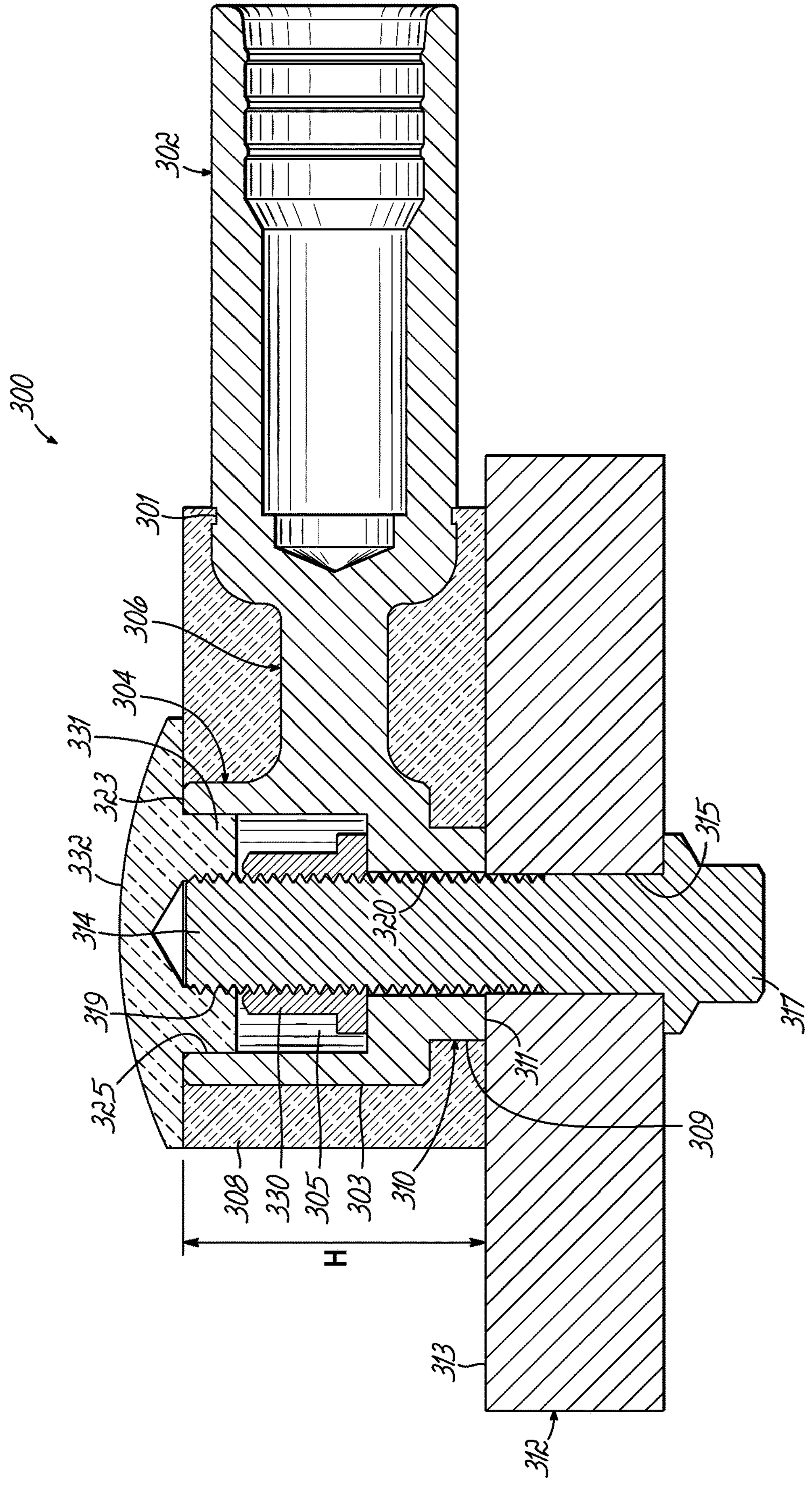
FIG. 18 is a cross sectional view of a terminal system in accordance with the embodiment of the invention in FIG. 15.

FIGS. 16-20 disclose an alternative embodiment of the arc resistant electrical terminal and grounding system of the invention. An attachable and readily detachable terminal is used with grounding structures as described herein to provide good electrical grounding or a power signal to a cable and greater flexibility in securing and reconfiguring the cables. Specifically, as illustrated in FIG. 16, a terminal 300 includes a body made of a suitable electrically conductive material, such as copper or aluminum. As disclosed, the body of the terminal 300 has a suitable wire receiving portion 302 that may be appropriately crimped onto a wire or cable conductor. The wire receiving portion 302 may resemble structures as described herein with respect to FIGS. 1-15. The body also includes a cup portion 304 as shown in FIGS. 17A and 18 that is electrically and physically coupled to the wire receiving portion 302 by a suitable connecting portion 306 (see FIG. 18). The cup portion 304 interfaces with a post 314 and conductive structure 312 to secure the terminal end of a cable and ensure a proper ground or power signal reference.

The cup portion 304 further includes a boss portion 310 that extends downwardly from the bottom of the cup portion 304 as illustrated in FIG. 18. In one embodiment, the boss portion is integrally formed with the cup portion 304. The boss portion 310 makes electrical contact with a flat mounting surface 313 of the conductive structure 312. The conductive structure 312 may provide a ground reference or a power signal and could be in the form of a bus bar, a mounting plate or block as appropriate to provide the electrical ground or power reference and structure for anchoring the end of a cable through the terminal 300. To that end, the boss portion 310 has a complementary flat or planar surface 311 that interfaces with surface 313.

Figure 18A:
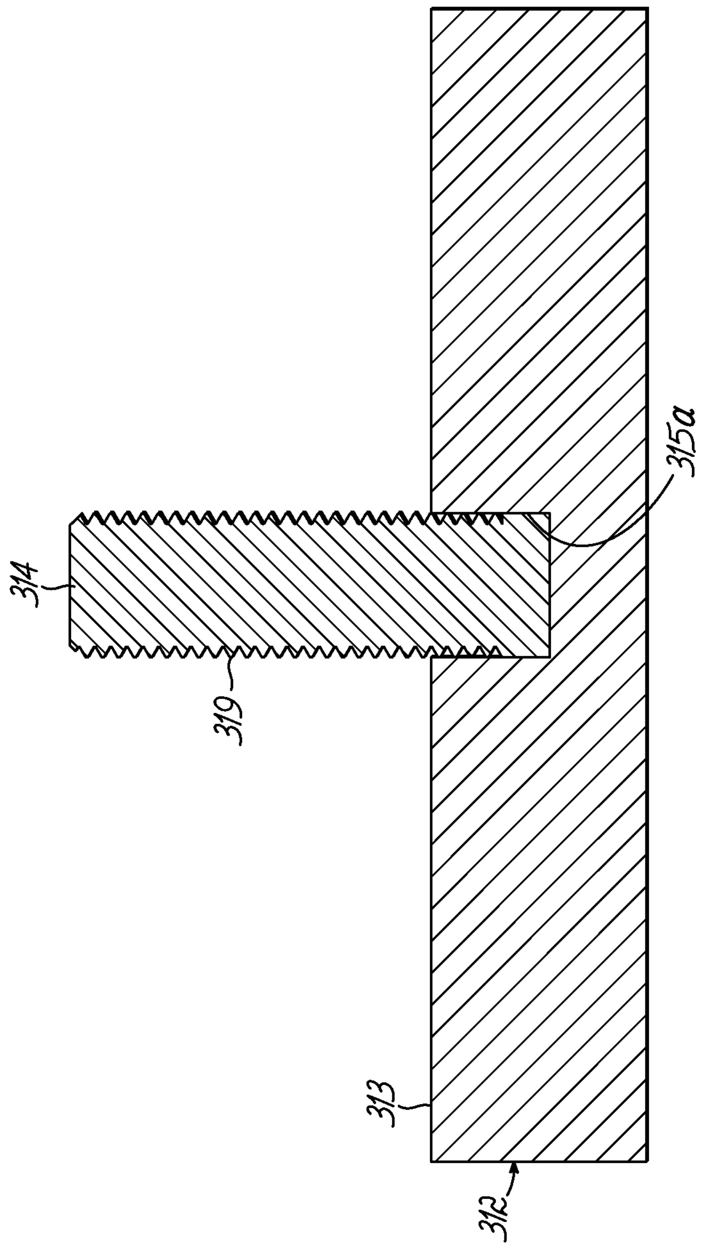
FIG. 18A is a cross sectional view of an alternative conductive post for the terminal system in accordance with the embodiment of the invention in FIG. 15.

In one embodiment of the invention as illustrated in FIGS. 16, 18, 18A, a conductive stud or post 314 extends upwardly from the conductive structure 312 and is coupled thereto for securing the cup portion 304 of the terminal. In the embodiment of FIG. 18, the post 314 is in the form of a bolt structure that fits through an aperture 315 in the conductive structure 312 as illustrated. The bolt has a head portion 317 that limits its passage through the aperture 315. The post 314 includes threads 319 on an outer surface thereof for securing the terminal cup portion 304 as described herein. The post 314 may be a stainless steel structure and could have an outer coating or sheath of a more highly conductive metal, such as copper. The post may be secured with the conductive structure 312, such as be soldering or otherwise affixing the post to the structure. In another embodiment as illustrated in FIG. 18A, the post 314*a* might be press fit or screwed into an appropriate feature 315*a* in the conductive structure 312.

Figure 20:
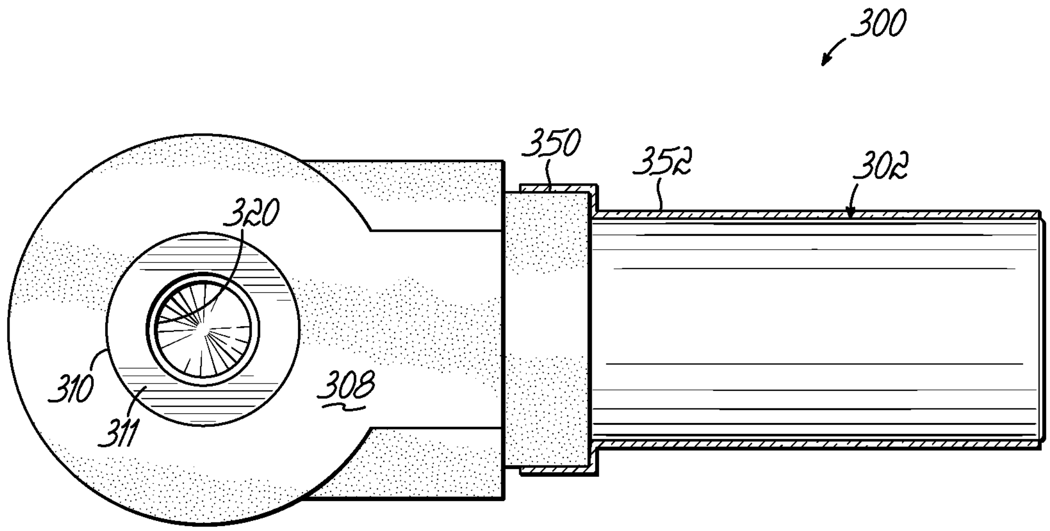
FIG. 20 a top view of a terminal in accordance with the embodiment of the invention in FIG. 15.

As shown in FIGS. 16, 18, 20, the body of terminal 300 includes an aperture 320 formed therein to extend through the cup portion 304 and boss portion 310. The aperture may be appropriately sized for receiving the post 314 and allowing passage of the post 314 through the terminal boss portion and cup portion when the terminal 300 is mounted to conductive structure 312 and post 314. That is, as shown in FIG. 18, the post 314 extends upwardly through the boss portion 310 and the cup portion 304 through the aperture 320 and into the inside area 305 of the cup portion.

In order to secure the terminal 300 and specifically secure the boss portion 310 and cup portion 304 to conductive structure 312, a fastener 330 engages the post and secures the cup portion and surface 311 of the boss portion against the surface 313. In one embodiment, the post 314 might include external threads 315. Then, as illustrated in FIGS. 16 and 18, a fastener 330, such as a threaded nut or other hardware fastener may be secured to the post 314 and tightened down to secure the cup portion 304 of terminal 300 against the conductive structure 312. Specifically, the exposed surface 311 of the boss portion is secured tightly against the surface 313 of the conductive structure 312. The fastener is configured to fit inside the area 305 of the cup portion to be contained therein. Although a single fastener 330 is shown in FIG. 16, it would be understood that other hardware, such as washers, locking washers, and other structures might be utilized for securing terminal 300 to post 314 and mounting plate 312. The fastener 330 is contained completely in the area 305 to be covered as described herein.

In accordance with one aspect of the invention, an overmold structure 308 of insulation material is formed on the cup portion. The overmold structure 308 covers the cup portion sides and the sides of the boss portion as seen in FIG. 18. FIG. 17A illustrates the terminal 300 without the overmold structure, showing the cup portion and boss portion, as well as the connecting portion. The overmold structure is made of appropriate insulation material that is formed on the terminal 300 so that the side surface 303 of the cup portion and side surface 309 of the boss portion are appropriately covered with a layer of insulation material. The insulation material may include a suitable silicone material or one or more of the following: a fluorocarbon material, PTFE, PFA, FEP, ETFE, a polymer material, PVC, polyurethane, a thermoplastic material, a phenolic material, rubber, a ceramic. In one embodiment, the insulation material may be injection molded as an overmold structure 308 to cover various portions 302, 304, 306 of the terminal 300 for the prevention of arcing. The overmold structure might also extend over part of the wire receiving portion 302 as well. To that end, the terminal 300 as illustrated in FIG. 17A might include a feature, such as an indent 301, that indicates the extend of the overmold structure 308 on the terminal. The overmold structure of insulation material 308 seals the electrical terminal 300 on the conductive structure 312 and electrically insulates the terminal 300. The overmold structure 308 covers the side surfaces 303 and 309 and extends down the height H of the cup portion and boss portion but does not cover the bottom surface 311 of the boss portion 310. The bottom surface 311 of the boss portion is exposed. In that way, insulation is provided between the cup portion 304 and connecting portion 306 with respect to the conductive structure, but a clear interface and conductive path is provided at the interfacing surfaces 311, 313. As shown in FIG. 18, the cup portion 304 is mounted on post 314 so that the exposed bottom surface 311 of the boss portion 310 mounts flush against a top surface 313 of the conductive structure 312 while the overmold structure surrounds the sides of the cup portion and boss portion. Electrical current then flows through the conductive structure 312, through the boss portion 310 and cup portion 304 and through the connecting portion 306 to wire receiving portion 302 and then to a wire, cable or other conductor that is crimped in portion 302.

In accordance with one aspect the invention, the cup portion 304 and boss portion may have a combined height H that is dimensioned so as create the area 305 to contain most of the exposed post 314 and fastener 330 inside of the cup portion 304 of the terminal. In that way, all of the conductive hardware is covered with insulation material so as to prevent arcing. As illustrated in FIG. 16, the top edge 323 and the inside surface 325 of the cup portion 304 that form the area 305 are exposed through the overmold structure 308 and the insulation material. The area 305 that is created within the insulated cup portion 304 by surface 325 completely surrounds and encapsulates the mounting post 314 and fastener 330.

In accordance with one embodiment of the invention, to further enclose post 314 and conductive surfaces 323, 325 of cup portion 304, an insulating material cap 332 is secured into the top of the cup portion. The insulative cap 332 is configured for engaging the overmold structure 308 and sealing the cup structure around the post 314 of the conductive structure 312. The insulative cap 332 fits over the opening of the cup portion 304 and area 305 and is dimensioned so as to overlie or overlap the overmold structure 308 proximate edge 323. In that way, the entire internal surface 325 of the cup portion 304 that forms the area 305 containing the exposed section of post 314 as well as fastener 330 and any other mounting hardware are also completely enclosed with insulation material. The cap may have a portion 331 that engages the inside surface 325 of the cup portion and may be made of suitable material, such as PTFE or some other polymer or other material similar to the insulation material of the overmold structure. The insulating cap 332 may be secured in the cup portion 304 and overmold structure 308 by suitable securement methods. For example, a friction fit of section 331 with the inside surface 325 of the cup portion might be used. In another embodiment as shown in FIG. 18, the portion 331 may include internal threads for threading onto the post 314 within the cup portion. Still other clip or lock structures might be used to allow the insulating cap 332 to be secured with the overmold structure to surround the terminal 300.

Figure 21B:
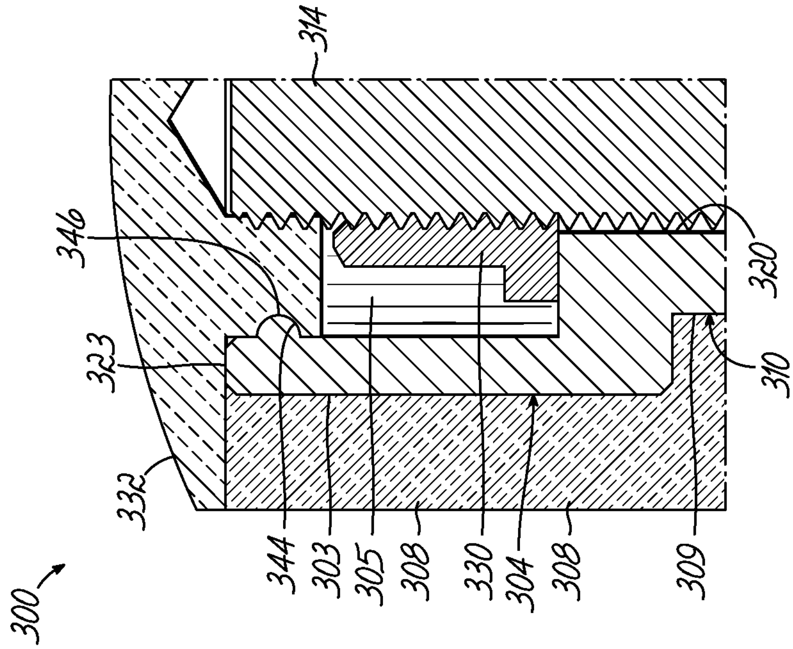
FIG. 21B is a partial cross-sectional view of a terminal in accordance with another embodiment of the invention in FIG. 15.
Figure 21A:
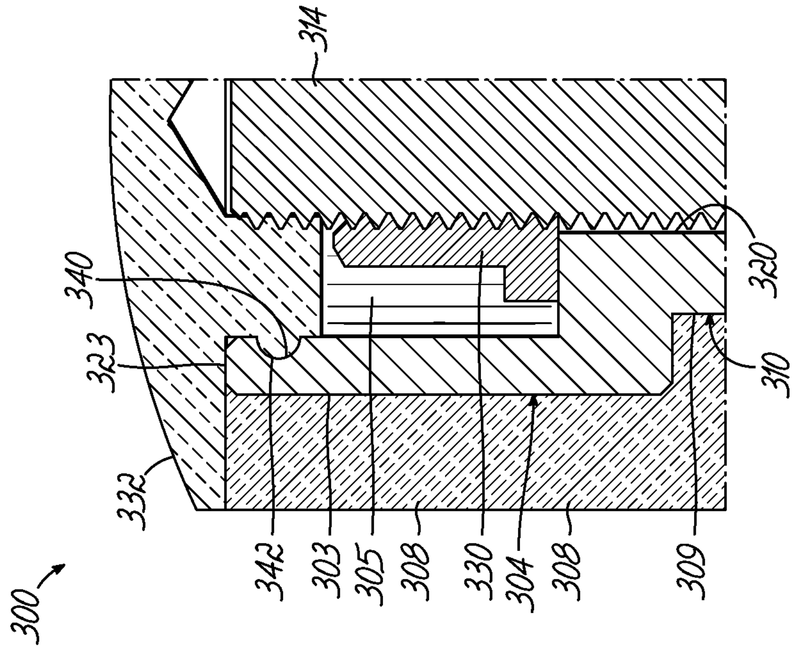
FIG. 21A is a partial cross-sectional view of a terminal in accordance with another embodiment of the invention in FIG. 15.

For example, FIGS. 21A and 21B illustrate possible embodiments wherein the cap 332 and the cup portion 304 are configured with complementary structures for a snap-in and lock engagement so the cap engages the overmold structure 308. For example, referring to FIG. 21A, the cup portion 304 may include an indent 340 formed in a ring around the top edge 323 of the cup portion 304 that receives a similarly shaped or complementary shaped ridge feature 342 formed around the cap 332 for snapping the cap into position on the terminal 300. Similarly, in FIG. 21B, an indent 344 formed in a ring around the cap 332 receives a similarly shaped or complementary shaped ridge feature 346 formed around the top edge 323 of the cup portion 304 of cap 332 for snapping the cap into position on the terminal 300 to engage the overmold structure 308 and seal the terminal.

Figure 22B:
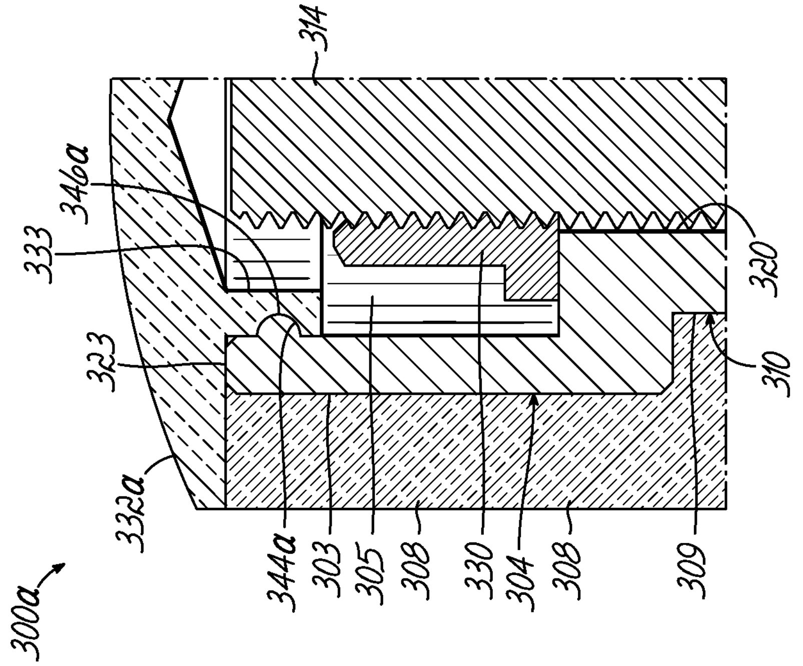
FIG. 22B is a partial cross-sectional view of a terminal in accordance with another embodiment of the invention in FIG. 15.
Figure 22A:
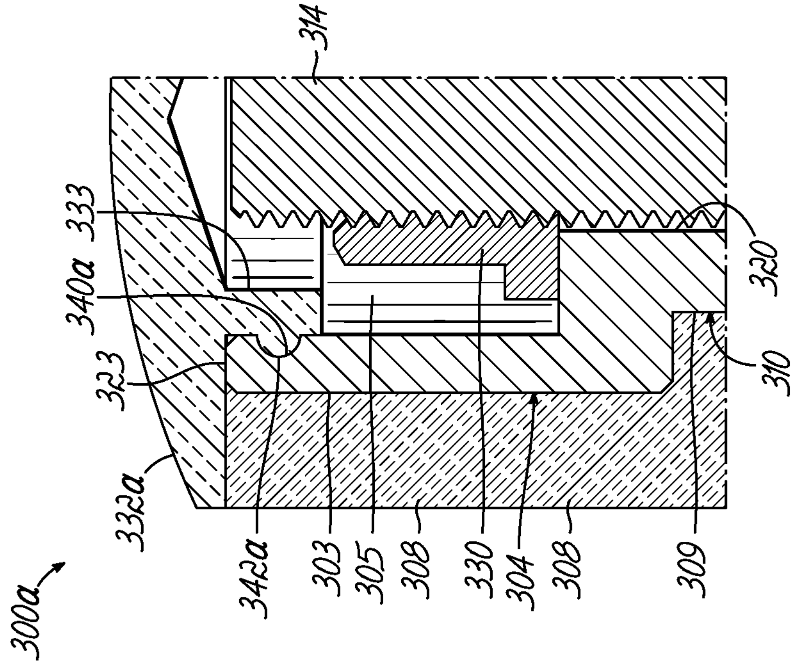
FIG. 22A is a partial cross-sectional view of a terminal in accordance with another embodiment of the invention in FIG. 15.

FIGS. 22A and 22B illustrate additional possible embodiments wherein the cap and the cup portion are also configured with complementary structures for a snap-in and lock engagement, so the cap engages the overmold structure 308. In such embodiments, the cap 332*a* is dimensioned so that an inner wall surface 333 is spaced away from the post 314 and threads of the post. The snap engagement of cap 332*a* means it is not dependent on the height of the post or stud 314. Also, the engagement of an audible snap interaction provides assurance that the cap is properly installed as opposed to other cap arrangements where it may be difficult to tall at a glance if the cap is seated all the way down. The cap 332*a* can freely snap into engagement with the cup portion 304. For example, referring to FIG. 22A, the cup portion 304 may include an indent 340*a* formed in a ring around the top edge 323*a* of the cup portion 304 that receives a similarly shaped or complementary shaped ridge feature 342*a* formed around the cap 332*a* for snapping the cap into position on the terminal 300*a*. Similarly, in FIG. 22B the orientation of features between the cap and cup portion may be reversed, similar to FIGS. 21A, 21B, and an indent 344*a* formed in a ring around the cap 332*a* receives a similarly shaped or complementary shaped ridge feature 346*a* formed around the top edge 323 of the cup portion 304 of cap 332 for snapping the cap into position on the terminal 300*a* to engage the overmold structure 308 and seal the terminal.

In accordance with another feature of the invention, the terminal 300 can be readily removed by removing insulating cap 332 to expose the post 314, fastener 330 or other hardware. The fastener(s) can be removed and the terminal 300 can then be readily slid from post 314. Similarly, the terminal 300 may be re-applied or attached as disclosed herein. In that way, the terminal can be installed and is encapsulated in insulating material without having to apply such material in a separate step, such as in a coating step with tapes or epoxies. Furthermore, the hardware can be readily removed without having to clean off insulating material from the exposed surfaces. Still further, operator safety is improved, and arcing events are reduced because the hardware attachment elements, including the post 314 and fasteners 330, are completely covered. As noted, the well or area 305 that is created within the insulated cup portion 304 completely surrounds and encapsulates the mounting post 314 and fastener 330.

Figure 19:
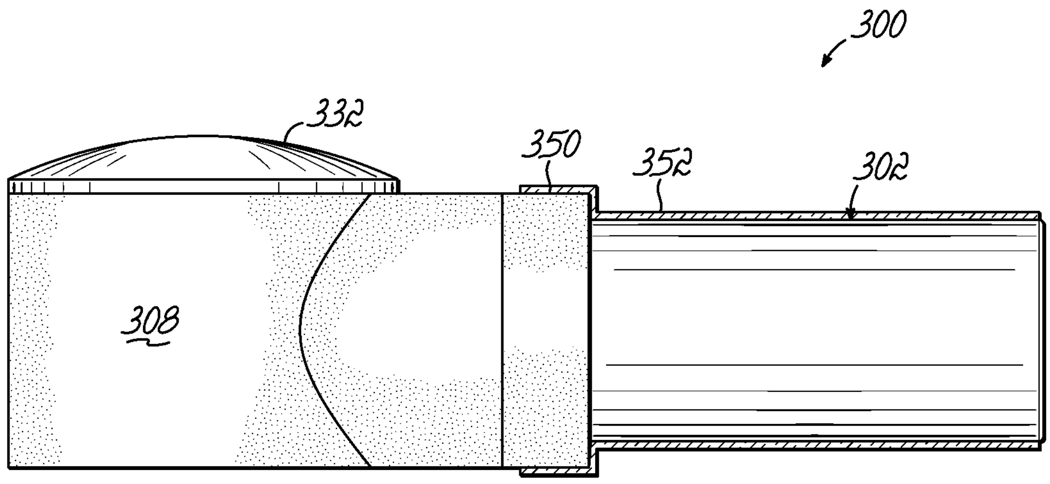
FIG. 19 is a side view of a terminal in accordance with the embodiment of the invention in FIG. 15.

For further insulation of the terminal 300, as illustrated in FIGS. 17, 19, 20, the overmold structure 308 includes a reduced diameter section 350 that is configured to receive a tubular portion of insulation material 352, such as heat shrink insulation material. The insulation material 352 fits over the section 350 and the wire receiving portion 302. The insulation material may also extend over a portion of the outer insulation of the wire or cable (not shown) that is attached to the terminal 300. Through application of heat, the insulation material 352 shrinks to cover the wire receiving portion 302 and reduced diameter section 350 and any cable insulation with which it overlaps to further seal the terminal against fluid and prevent electrical arcing.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. An electrical terminal for coupling to a conductive structure, the electrical terminal comprising:

a body having a wire receiving portion for receiving a conductor;

a cup portion electrically coupled with the wire receiving portion;

a boss portion extending from the cup portion and including a planar surface for interfacing with the conductive structure;

an aperture formed in the body and extending through the cup portion and the boss portion, the aperture configured to receive a post of the conductive structure;

an overmold structure of insulation material formed on the cup portion, the overmold structure covering the cup portion sides;

the boss portion configured to surround the aperture for providing an electrically conductive surface free from insulation material for interfacing with the conductive structure;

an insulative cap configured for engaging the overmold structure and sealing the cup structure around a post of a conductive structure.

2. The electrical terminal of claim 1 further comprising a connecting portion for connecting the wire receiving portion and cup portion of the terminal body, the overmold structure of insulation material formed over the connecting portion.

3. The electrical terminal of claim 1, further comprising a fastener configured for engaging a post of the conductive structure and securing the boss portion against the conductive structure.

4. The electrical terminal of claim 3 wherein the cup portion forms an area therein, the fastener configured to fit inside the area of the cup portion to be sealed with the post.

5. The electrical terminal of claim 3 wherein the post of the conductive structure has threads thereon for the fastener to engage for securing the boss portion against the conductive structure.

6. The electrical terminal of claim 1 wherein the overmold structure is injection molded onto the cup portion.

7. The electrical terminal of claim 1 wherein the overmold structure of insulation material is formed on at least a portion of the wire receiving portion.

8. The electrical terminal of claim 1 wherein the cup portion and insulative cap each include complementary structures for engagement to secure the insulative cap with the cup portion and overmold structure.

9. The electrical terminal of claim 1 wherein the boss portion is integrally formed with the cup portion.

10. The electrical terminal of claim 1 wherein the overmold structure is formed of an insulation material that includes a material selected from one or more of the following: a fluorocarbon material, PTFE, PFA, FEP, ETFE, a polymer material, PVC, polyurethane, a thermoplastic material, a phenolic material, silicone, rubber, a ceramic.

11. An electrical grounding or power system comprising:

a conductive structure having a post extending therefrom an electrical terminal for electrically coupling with the conductive structure, the electrical terminal including:

a body having a wire receiving portion for receiving a conductor;

a cup portion electrically coupled with the wire receiving portion;

a boss portion extending from the cup portion and including a planar surface for interfacing with the conductive structure;

an aperture formed in the body and extending through the cup portion and the boss portion, the aperture configured to receive the post of the conductive structure;

an overmold structure of insulation material formed on the cup portion, the overmold structure covering the cup portion sides;

the boss portion configured to surround the aperture for providing an electrically conductive surface free from insulation material for interfacing with the conductive structure;

an insulative cap configured for engaging the overmold structure and sealing the cup structure around a post of a conductive structure.

12. The electrical grounding or power system of claim 11 further comprising a connecting portion for connecting the wire receiving portion and cup portion of the terminal body, the overmold structure of insulation material formed over the connecting portion.

13. The electrical grounding or power system of claim 11, further comprising a fastener configured for engaging the post and securing the boss portion against the conductive structure.

14. The electrical grounding or power system of claim 13 wherein the cup portion forms an area therein, the fastener configured to fit inside the area of the cup portion to be sealed with the post.

15. The electrical grounding or power system of claim 13 wherein the post of the conductive structure has threads thereon for the fastener to engage for securing the boss portion against the conductive structure.

16. The electrical grounding or power system of claim 11 wherein the overmold structure is injection molded onto the cup portion.

17. The electrical grounding or power system of claim 11 wherein the overmold structure of insulation material is formed on at least a portion of the wire receiving portion.

18. The electrical grounding or power system of claim 11 wherein the cup portion and insulative cap each include complementary structures for engagement to secure the insulative cap with the cup structure and overmold structure.

19. The electrical grounding or power system of claim 11 wherein the boss portion is integrally formed with the cup portion.

20. The electrical grounding or power system of claim 11 wherein the overmold structure is formed of an insulation material that includes a material selected from one or more of the following: a fluorocarbon material, PTFE, PFA, FEP, ETFE, a polymer material, PVC, polyurethane, a thermoplastic material, a phenolic material, silicone, rubber, a ceramic.

* * * * *